US012581205B2

(12) United States Patent
Liang et al.

(10) Patent No.: US 12,581,205 B2
(45) Date of Patent: Mar. 17, 2026

(54) HYBRID WHITE-BALANCE MODE IN A CAMERA SYSTEM OF AN ELECTRONIC DEVICE

(71) Applicant: Google LLC, Mountain View, CA (US)

(72) Inventors: Liang Liang, San Diego, CA (US); Michelle Y. Chen, Somerville, MA (US); Isaac William Reynolds, Longmont, UT (US); Shih-Ming Wang, San Jose, CA (US)

(73) Assignee: Google LLC, Mountain View, CA (US)

( * ) Notice: Subject to any disclaimer, the term of this patent is extended or adjusted under 35 U.S.C. 154(b) by 80 days.

(21) Appl. No.: 18/562,632

(22) PCT Filed: May 20, 2021

(86) PCT No.: PCT/US2021/033487
§ 371 (c)(1),
(2) Date: Nov. 20, 2023

(87) PCT Pub. No.: WO2022/245364
PCT Pub. Date: Nov. 24, 2022

(65) Prior Publication Data
US 2024/0373136 A1 Nov. 7, 2024

(51) Int. Cl.
*H04N 23/88* (2023.01)
*H04N 23/63* (2023.01)
*H04N 23/667* (2023.01)

(52) U.S. Cl.
CPC ........... *H04N 23/88* (2023.01); *H04N 23/632* (2023.01); *H04N 23/667* (2023.01)

(58) Field of Classification Search
CPC .. H04N 23/631; H04N 23/632; H04N 23/667; H04N 23/88
(Continued)

(56) References Cited

U.S. PATENT DOCUMENTS 7,212,234 B2 * 5/2007 Sakaguchi ............. H04N 23/88
396/374
7,417,671 B2 * 8/2008 Sugimori ............. H04N 1/6077
348/E9.052
(Continued)

FOREIGN PATENT DOCUMENTS

EP 2482543 8/2021

OTHER PUBLICATIONS

Wesson, Kate, "How to Use White Balance to Get Perfect Colors in your iPhone Photos," http://iphonephotographyschool.com/white-balance/, downloaded Nov. 20, 2023, 24 pages.

*Primary Examiner* — Pritham D Prabhakher
(74) *Attorney, Agent, or Firm* — McDonnell Boehnen Hulbert & Berghoff LLP

(57) ABSTRACT

This document describes methods and systems for a hybrid white balance, HWB, mode (114), which is a hybrid of automatic and manual WB modes, in a camera system (104) of an electronic device (102). The HWB mode may provide options for a user to select a WB setting, via a camera user interface (118) in a live-preview mode (110), along a continuous WB-adjustment range. In this way, the user's desired color can be applied with respect to images or video captured by the camera system. The camera UI includes a manual WB control (112) to manually adjust the white balance. A WB module (108) determines target WB gains corresponding to the manual WB control relative to an initial automatic WB decision for a current frame displayed in the live-preview mode of the camera application. In aspects, a look-up-table correlating to the manual WB control is used to compute the target WB gains.

15 Claims, 18 Drawing Sheets

900

(58) Field of Classification Search
     USPC ...................................................... 348/223.1
     See application file for complete search history.

(56)                  References Cited

U.S. PATENT DOCUMENTS

| | | | |
|---|---|---|---|
| 7,839,436 B2 * | 11/2010 | Hamamura | H04N 23/88 |
| | | | 348/223.1 |
| 8,471,924 B2 * | 6/2013 | Nagoya | H04N 23/66 |
| | | | 348/333.02 |
| 8,736,708 B2 * | 5/2014 | Nagoya | H04N 23/88 |
| | | | 348/333.02 |
| 8,823,726 B2 * | 9/2014 | Pettigrew | H04N 9/73 |
| | | | 345/589 |
| 9,912,927 B2 * | 3/2018 | Li | H04N 23/632 |
| 10,021,362 B2 * | 7/2018 | Takasumi | H04N 23/88 |
| 10,244,218 B2 * | 3/2019 | Yamamoto | H04N 23/62 |
| 10,873,703 B2 * | 12/2020 | Miyajima | H04N 23/62 |
| 2005/0128316 A1 | 6/2005 | Sugimori | |
| 2008/0062274 A1 * | 3/2008 | Hamamura | H04N 23/633 |
| | | | 348/222.1 |
| 2011/0050927 A1 * | 3/2011 | Nagoya | H04N 23/661 |
| | | | 348/E5.042 |
| 2011/0285745 A1 * | 11/2011 | Zhang | H04N 23/62 |
| | | | 345/593 |
| 2012/0206655 A1 | 8/2012 | Pettigrew et al. | |
| 2016/0269706 A1 | 9/2016 | Li et al. | |
| 2017/0180620 A1 * | 6/2017 | Takasumi | H04N 23/88 |
| 2017/0295351 A1 * | 10/2017 | Yamamoto | H04N 1/6027 |
| 2020/0007788 A1 * | 1/2020 | Miyajima | H04N 23/633 |

* cited by examiner

100

120
102

120

112

118

| Electronic Device |
| 102 |

| Camera System |
| 104 |

| Camera Application |
| 106 |

| Live-Preview Mode |
| 110 |

| Manual White-Balance |
| Control 112 |

| White-Balance Module |
| 108 |

| Hybrid White-Balance |
| Mode 114 |

| White-Balance-Mode |
| Control 116 |

200

Figure 3:
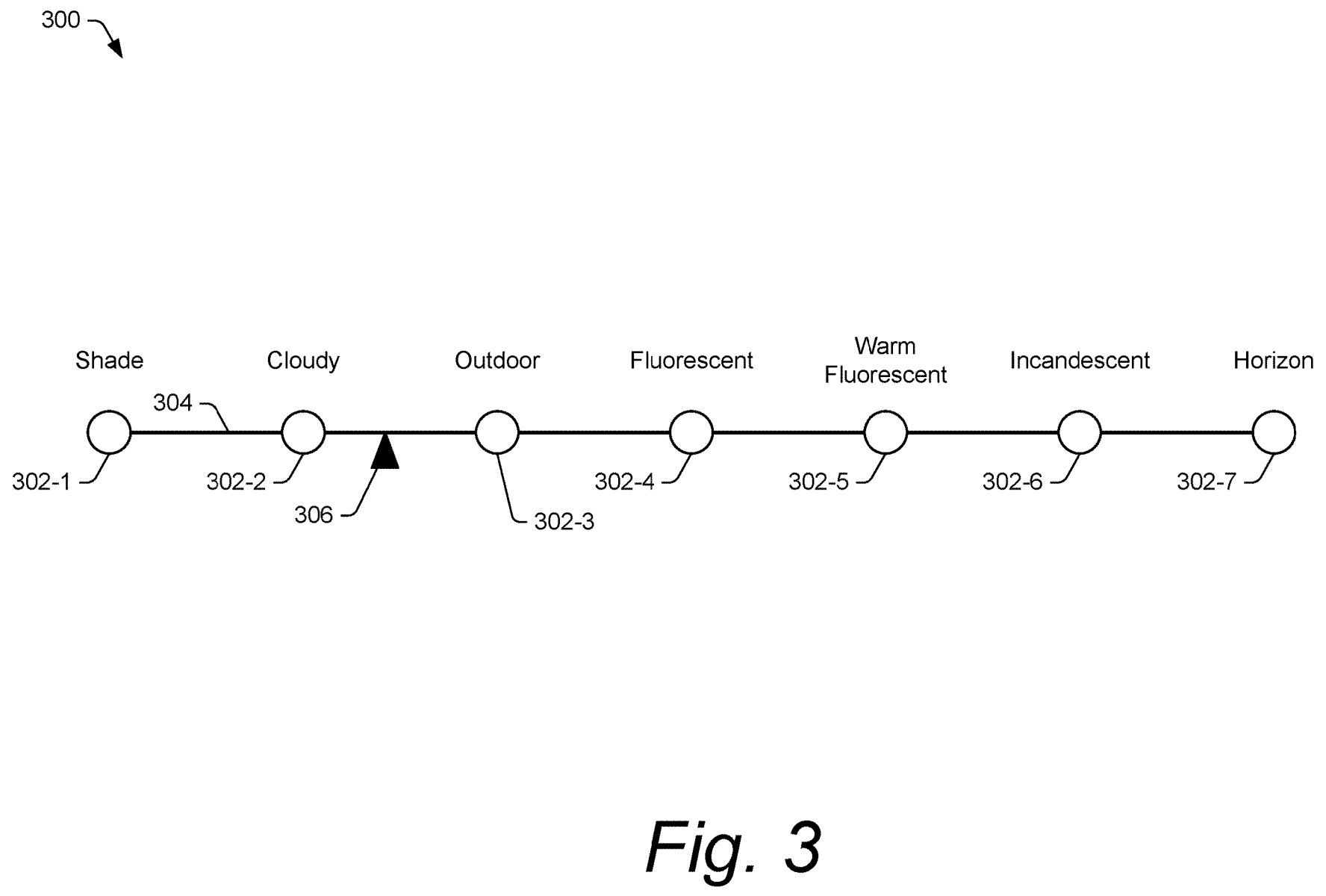

300

Shade
302-1

Cloudy
304
302-2

306

Outdoor
302-3

Fluorescent
302-4

Warm
Fluorescent
302-5

Incandescent
302-6

Horizon
302-7

Camera App MWB
Selected
1102

1004

Touch WB Flag
and Touch ROI

Enable touch
WB Mode
1106

AWB Auto Mode: Compute WB
decision based on stats inside the
touch ROI
1108

1110
WB Gains
[Rgain, Ggain, Bgain]

1500

1502

Warm [Red_Max_Gain_Adjust, Blue_Min_Gain_Adjust]

306

$d_{slider}$ [R_adjust, B_adjust]

304

1506

Center: auto WB gains (R, B initial gain adjust = [1.0, 1.0]

Cool [Red_Min_Gain_Adjust, Blue_Max_Gain_Adjust]

1504

1700

Metadata determination
from MWB Control
1702

1704

Metadata [Manual mode
flag, float value d_slider]

WB-Mode Control
1706

MWB
mode enabled?
1708

Yes

Manual WB
Computation
1710

No

Auto WB
Computation
1712

Output (e.g., WB Gains [Rgain, Ggain, Bgain],
CCT, CCM) to camera application
1714

1800

1804

1806

306

1810

120

1802

1808

HYBRID WHITE-BALANCE MODE IN A CAMERA SYSTEM OF AN ELECTRONIC DEVICE

This application is a national stage application under 35 U.S.C. § 371 of International Application No. PCT/US2021/033487, filed May 20, 2021, the disclosure of which is explicitly incorporated by reference herein in its entirety.

BACKGROUND

Digital cameras generally have many features usable to adjust characteristics (e.g., color, clarity, magnification) of an image or video. Some features are applied pre-processing (e.g., during a live-preview mode prior to image capture), and other features are applied post-processing (e.g., subsequent to image capture). One such feature includes white balance (WB), which is a camera setting that adjusts how colors are rendered in an image. White balance is generally used to cause objects that appear white in reality to be rendered white in the image. To assist users, many cameras include an automatic WB feature, which automatically adjusts the WB according to a color-correction algorithm. However, conventional camera systems may not be able to achieve 100% accuracy for all illuminant conditions. Additional challenges arise when attempting to meet an individual person's preference on color appearance for images and videos. Many manual WB controls rely on a group of preset gains or color temperatures to adjust the image color. However, as the real scene illuminants can deviate significantly from the limited number of preset gains, such a manual WB control may not achieve accurate color correction.

SUMMARY

This document describes methods and systems for a white-balance (WB) mode which is a hybrid of automatic and manual WB modes, in a camera system of an electronic device. The hybrid WB (HWB) mode has a manual mode which may provide options for a user to select a WB setting, via a camera user interface (UI) in a live-preview mode, along a continuous WB-adjustment range. In this way, the user's desired color can be applied with respect to images or video captured by the camera system. The camera UI includes a manual WB control to manually adjust the white balance. In addition, a WB module determines target WB gains corresponding to the manual WB control relative to an initial automatic WB (AWB) decision for a current frame displayed in the live-preview mode (e.g., pre-processing) of the camera application. In an example, a look-up-table (LUT) correlating to the manual WB control is used to compute the target WB gains.

In aspects, a method for an HWB mode in a camera application of an electronic device is disclosed. The method includes presenting, during a live-preview mode of the camera application, a manual white-balance (MWB) control on a camera user interface displayed on a display device of the electronic device, the MWB control configured to enable user selection of a WB setting for performing a manual adjustment on a white balance with respect to a current frame presented in the live-preview mode of the camera application. The method also includes determining, using an AWB mode, an AWB decision on a red-green-blue (RGB) scale for the current frame based on one or more characteristics of the current frame and receiving a user input that adjusts the MWB control displayed in the camera user interface. In addition, the method includes determining, using an MWB mode, target WB gains for a WB adjustment of the current frame based on the user input to the MWB control and relative to the AWB decision, the AWB decision used as initial WB gains to determine the target WB gains that correspond to the user input to the MWB control. Also, the method includes applying the target WB gains to the current frame presented in the live-preview mode of the camera application for color correction.

In aspects, a mobile electronic device comprises a display device, a camera system, one or more processors, and memory. The memory stores instructions that, when executed by the one or more processors, cause the one or more processors to implement an HWB mode for the camera system by performing the method of any one of the methods described above.

In aspects, a computer-readable medium comprising instructions which, when executed by one or more processors, cause the one or more processors to carry out the method described above.

This summary is provided to introduce simplified concepts concerning a hybrid white-balance mode in a camera system of an electronic device, which is further described below in the Detailed Description and Drawings. This summary is not intended to identify essential features of the claimed subject matter, nor is it intended for use in determining the scope of the claimed subject matter.

BRIEF DESCRIPTION OF THE DRAWINGS

The details of one or more aspects of a hybrid white-balance mode in a camera system of an electronic device are described in this document with reference to the following drawings. The same numbers are used throughout the drawings to reference like features and components:

FIG. 3 illustrates an example implementation of a MWB control in a camera system of an electronic device;

DETAILED DESCRIPTION

Overview

This document describes methods and systems for a hybrid white-balance mode in a camera system of an electronic device. This mode provides an MWB control that uses a decision made by an AWB mode as a starting point of an MWB adjustment. Rather than predefining several preset WB illuminant points, the MWB adjustment is based on an AWB decision for a current frame and then enables a user to manually adjust the white balance to achieve a desired color correction. The MWB control provides different directions of color that can be adjusted.

For example, the MWB control can be used to adjust the white balance between red colors (higher color temperatures) and blue colors (lower color temperatures) and/or between purple and green colors. By moving the MWB control toward the red color, the color tone becomes warmer. Moving the MWB control toward the blue color results in a cooler color tone. Similarly, adjusting the MWB control toward the purple color results in a warmer color tone, while a direction toward the green color causes a cooler color tone.

The MWB control also includes different user-selectable mode-variants that enable a user input to manually adjust the white balance in different ways. For example, the user can select a touch-WB variant and then touch a location on the display device to designate a region of interest, corresponding to the user's touch, to be used for the AWB decision. In this way, the AWB decision for a current frame is calculated based on the user-selected region of interest in the current frame.

In another example, the user can select a continuous-control or "preference"-color variant, which may provide one or more sliders that the user can use to manually adjust the white balance. A user-selected location on the slider is determined using a look-up-table that defines WB gains for at least the end points of the slider. In another example, the target WB gains can be computed in real time based on the calibrated illuminants' reference lines.

In yet another example, the user can select a preset-illuminants variant, which provides a slider that the user can use to manually adjust the white balance. A user-selected location on the slider may be determined by interpolation between the nearest preset illuminant points on opposing sides of the user-selected location.

While features and concepts of the described methods and systems for a hybrid white-balance mode in a camera system of an electronic device can be implemented in any number of different environments, aspects are described in the context of the following examples.

Example Device

Figure 1:
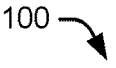
FIG. 1 illustrates an example implementation of an electronic device capable of implementing a hybrid white-balance mode in a camera system of an electronic device in accordance with the techniques described herein.

FIG. 1 illustrates an example implementation 100 of an electronic device (e.g., electronic device 102) capable of implementing a hybrid white-balance mode in a camera system of an electronic device in accordance with the techniques described herein. The electronic device 102 is illustrated as including a camera system 104, a camera application 106, and a white-balance module 108 ("WB module 108"). In aspects, the camera application 106 includes a live-preview mode 110 and a manual-white-balance control 112 ("MWB control 112"). Further, the WB module 108 includes a hybrid white-balance mode 114 ("HWB mode 114") and a white-balance-mode control 116 ("WB-mode control 116"). The HWB mode 114 includes both a manual mode (e.g., MWB mode) and an automatic mode (e.g., AWB mode) and enables the WB module 108 to use a WB-mode control 116 to switch between and/or combine functionalities of the manual and automatic WB modes.

The camera application 106 provides a camera UI 118, which may be rendered via a display device 120 of the electronic device 102. The live-preview mode 110 of the camera application 106 is rendered via the camera UI 118 to provide real-time video of a current scene within a field of view (FOV) of a lens of the camera system 104, causing display device 120 to act as a viewfinder for the camera system 104.

The WB module 108 is configured to automatically estimate WB settings for the camera system 104 to adjust color rendered in the live-preview mode 110 of the camera application 106. In aspects, the WB module 108 may automatically select and apply WB gains based on one or more predefined illuminant conditions that most-closely correspond to a current illuminant condition surrounding the electronic device 102.

The MWB control 112 is configured to enable the user to adjust one or more directions of color, e.g., between red and blue or between purple and green. In aspects that are further described herein, the user can use the MWB control 112 to manually adjust the WB gains along a continuous range that is not limited to specific gain settings defined by the predefined illuminant conditions.

The HWB mode 114 combines features and functionalities of the WB module 108 and the MWB control 112 to enhance the precision of accurate color correction, providing fine control of the color correction to the user. In an example, the HWB mode 114 enables the WB module 108 to switch between auto and manual modes for correcting the white balance of one or more frames in the live-preview mode 110 of the camera application 106. In addition, when switching to the manual mode, the WB module 108 can first estimate WB gains for the current frame using the auto mode and then adjust the WB gains, according to a user input to the MWB control 112, relative to the initial WB gain estimation.

Figure 2:
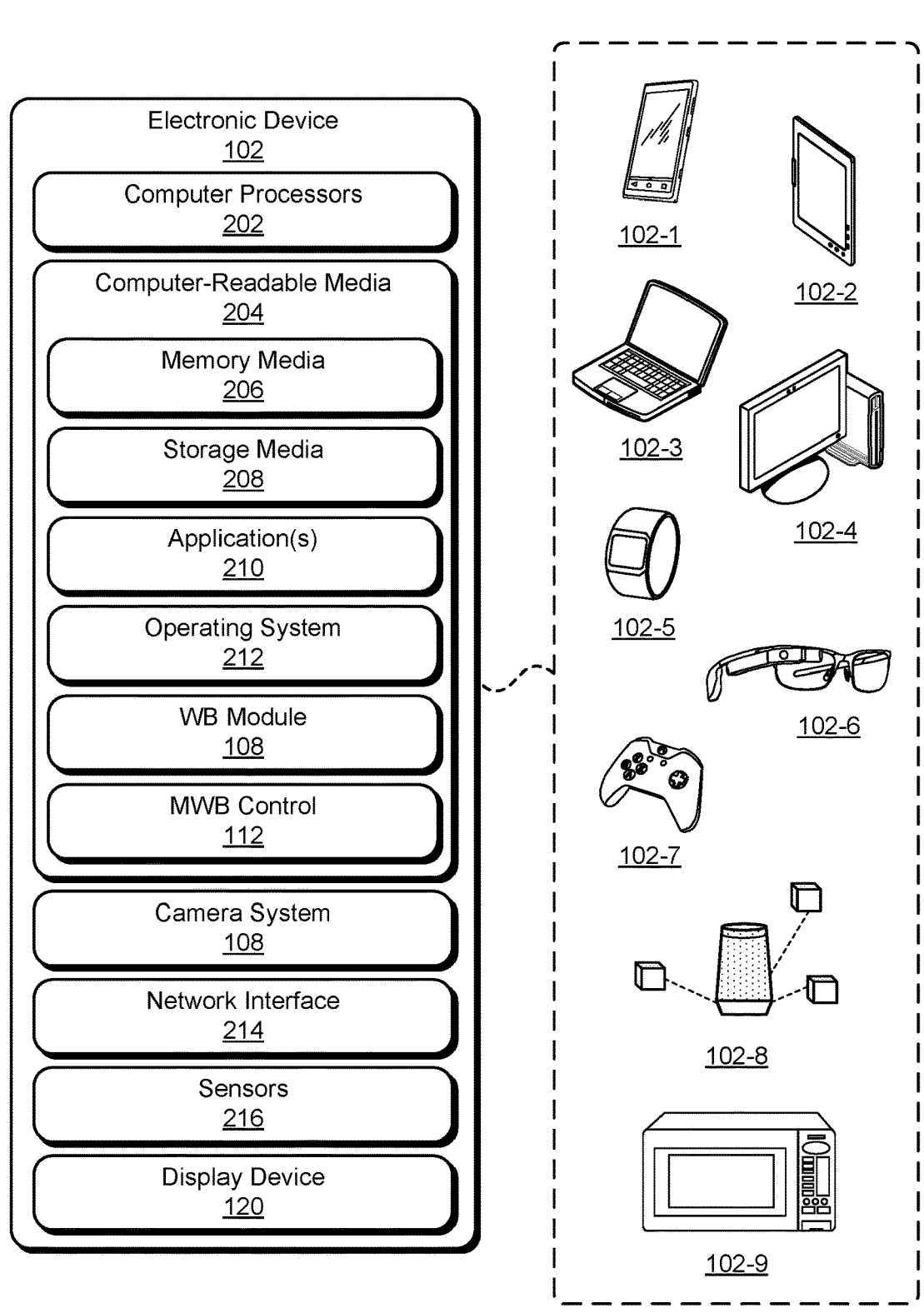
FIG. 2 illustrates an example implementation of the electronic device from FIG. 1 in more detail.

In more detail, consider FIG. 2, which illustrates an example implementation 200 of the electronic device 102 from FIG. 1. The electronic device 102 of FIG. 2 is illustrated with a variety of example devices, including a smartphone 102-1, a tablet 102-2, a laptop 102-3, a desktop computer 102-4, a computing watch 102-5, computing spectacles 102-6, a gaming system 102-7, a home-automation and control system 102-8, and a microwave 102-9. The electronic device 102 can also include other devices, e.g., televisions, entertainment systems, audio systems, automobiles, drones, track pads, drawing pads, netbooks, e-readers, home security systems, and other home appliances. Note that the electronic device 102 can be mobile, wearable, non-wearable but mobile, or relatively immobile (e.g., desktops and appliances).

The electronic device 102 also includes one or more computer processors 202 and one or more computer-readable media 204. The one or more computer-readable media 204 includes memory media 206 and storage media 208. Applications 210 and/or an operating system 212 implemented as computer-readable instructions on the computer-readable media 204 can be executed by the computer processors 202 to provide some or all of the functionalities described herein. For example, the computer-readable media 204 can include the camera application 106, the WB module 108, and the MWB control 112.

The electronic device 102 also includes the camera system 104, which is configured to capture images, video, and audio. Any suitable camera system 104 may be implemented in the electronic device 102. The camera system 104 may be a digital camera that converts light captured by a lens to digital data representing a scene within the field of view of the lens.

The electronic device 102 may also include a network interface 214. The electronic device 102 can use the network interface 214 for communicating data over wired, wireless, or optical networks. By way of example and not limitation, the network interface 214 may communicate data over a local-area-network (LAN), a wireless local-area-network (WLAN), a personal-area-network (PAN), a wide-area-network (WAN), an intranet, the Internet, a peer-to-peer network, point-to-point network, or a mesh network.

Various implementations of the camera system 104 can include a System-on-Chip (SoC), one or more Integrated Circuits (ICs), a processor with embedded processor instructions or configured to access processor instructions stored in memory, hardware with embedded firmware, a printed circuit board with various hardware components, or any combination thereof.

The electronic device 102 also includes one or more sensors 216, which can include any of a variety of sensors, including an audio sensor (e.g., a microphone), a touch-input sensor (e.g., a touchscreen), an image-capture device (e.g., a camera or video-camera), proximity sensors (e.g., capacitive sensors), or an ambient light sensor (e.g., photodetector).

The electronic device 102 can also include a display device (e.g., the display device 120). The display device 120 can include any suitable touch-sensitive display device, e.g., a touchscreen, a liquid crystal display (LCD), thin film transistor (TFT) LCD, an in-place switching (IPS) LCD, a capacitive touchscreen display, an organic light-emitting diode (OLED) display, an active-matrix organic light-emitting diode (AMOLED) display, super AMOLED display, and so forth. The display device 120 may be referred to as a display or a screen, such that content may be displayed on-screen.

These and other capabilities and configurations, as well as ways in which entities of FIGS. 1 and 2 act and interact, are set forth in greater detail below. These entities may be further divided, combined, and so on. The implementation 100 and the detailed illustrations of FIG. 2 through FIG. 18 illustrate some of many possible environments, devices, and methods capable of employing the described techniques, whether individually or in combination with one another.

FIG. 3 illustrates an example implementation 300 of an MWB control in a camera system of an electronic device. In FIG. 3, a group of preset WB illuminant gains (e.g., presets 302) are shown along a range. Each of the preset WB illuminant gains may be calibrated by lab-standard illuminants. Some example preset WB illuminant gains may correspond to shade 302-1, cloudy 302-2, outdoor 302-3, fluorescent 302-4, warm fluorescent 302-5, incandescent 302-6, and horizon 302-7. In operation, however, there exists a wide variety of illuminations that may deviate from the lab-standard illuminants. Accordingly, the techniques described herein provide manually adjustable functionality between the preset WB illuminant gains. For example, FIG. 3 includes a slider 304 that is based on the preset WB illuminant gains. The slider 304 may be an instance of the MWB control 112 in FIG. 1. A user can slide an indicator 306 along the slider 304 between (and including) shade 302-1 and horizon 302-7 to determine WB gains for correcting a scene illuminant of the scene in the field of view of the camera.

The HWB mode 114 can be selected by passing metadata information from the camera application 106 to the WB module 108. The metadata may include an indication (e.g., flag) of manual mode "ON." In response to receiving such an indication, the WB module 108 disables the AWB mode and switches to the MWB mode. The MWB mode includes multiple preset gains corresponding to preset WB points (e.g., the presets 302).

To provide a continuous WB gain computation between the presets 302, an interpolation function may be implemented. The interpolation function may use an interpolation ratio based on a correlated color temperature of a preset WB point (e.g., presets 302). Table 1 illustrates example color temperatures (in Kelvin (K)) of the presets 302.

TABLE 1

| Example Manual White Balance Points and Correlated Color Temperatures | | |
| --- | --- | --- |
| Index | Manual WB Point | Correlated Color Temperature |
| 0 | Shade | 7500 K |
| 1 | Cloudy | 6500 K |
| 2 | Daylight | 5000 K |
| 3 | Fluorescent | 4100 K |
| 4 | Warm Fluorescent | 3800 K |
| 5 | Incandescent | 3200 K |
| 6 | Horizon | 2800 K |

Figure 4:
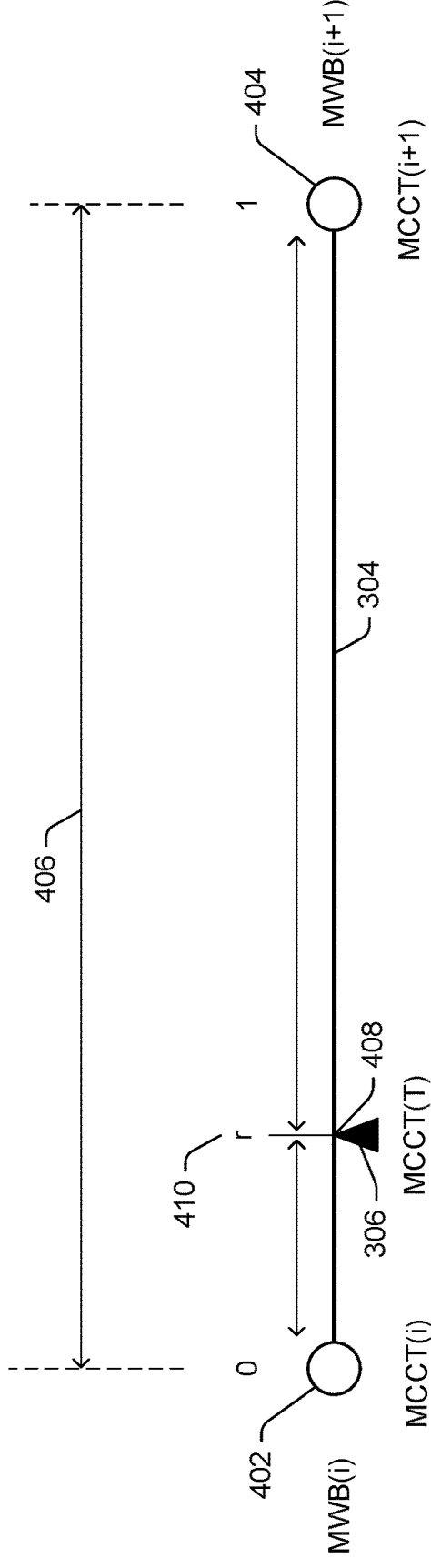
FIG. 4 illustrates an example of an interpolation ratio and color correction temperature.

Consider FIG. 4, which illustrates an example 400 of an interpolation ratio and color correction temperature. In the illustrated example, a user-selected WB point is located between two preset WB points (e.g., MWB(i) 402 and MWB(i+1) 404), which may correspond to two adjacent presets 302 from FIG. 3. The term i refers to the index of the preset WB points, including those shown in Table 1 (e.g., i∈[0, 6]). A distance 406 between MWB(i) 402 and MWB(i+1) 404 may be normalized to [0, 1], with zero at MWB(i) 402 and one at MWB(i+1) 404. When the user selects a location for the indicator 306 on the slider 304, a corresponding WB point (e.g., user-selected WB point 408) on the slider 304 is determined, and a ratio r (e.g., ratio 410) is obtained. The MWB(i) 402, the MWB(i+1) 404, and the ratio 410 are sent to an AWB algorithm to compute target WB gains for the user-selected WB point 408.

Assume the color correction temperature (CCT) of the illuminant MWB(i+1) is CCT(i+1), and the CCT of the illuminant MWB(i) is CCT(i). Then, the CCT of the target manual WB point (CCT(T)) can be computed using the following equation:

$$CCT(T) = CCT(i) - r * [CCT(i) - CCT(i+1)] \qquad \text{Equation 1}$$

In Equation 1, the illuminant CCT ranges from high to low (e.g., from MWB(i) to MWB(i+1)). The target WB gains can then be computed by interpolation of the preset gains of the preset WB points by using CCT as the interpolation weight. In aspects, the CCT is normalized by a Mired CCT (MCCT) before being used as the weighting for the computation of the target WB gains. The MCCT(i), MCCT(i+1), and MCCT(T) are computed using the following:

$$MCCT = \frac{10^6}{CCT} \qquad \text{Equation 2}$$

Target WB gains (TMWB) may include gains on a red-green-blue (RGB) scale. In aspects, Rgain and Bgain can be computed and Ggain can be kept constant. For example, TMWB(Rgain, Ggain, Bgain) can be computed using the following:

$$Rgain(T) = \frac{[Rgain(i) * (MCCT(T) - MCCT(i)) + Rgain(i+1) * (MCCT(i+1) - MCCT(T))]}{(MCCT(i+1) - MCCT(i))} \qquad \text{Equation 3}$$

$$Bgain(T) = \frac{[Bgain(i) * (MCCT(T) - MCCT(i)) + Bgain(i+1) * (MCCT(i+1) - MCCT(T))]}{(MCCT(i+1) - MCCT(i))} \qquad \text{Equation 4}$$

Figure 5:
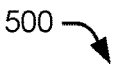
FIG. 5 depicts an example flowchart of a feedback loop between a camera application and the WB module for an MWB selection between preset WB points.
Figure 5:
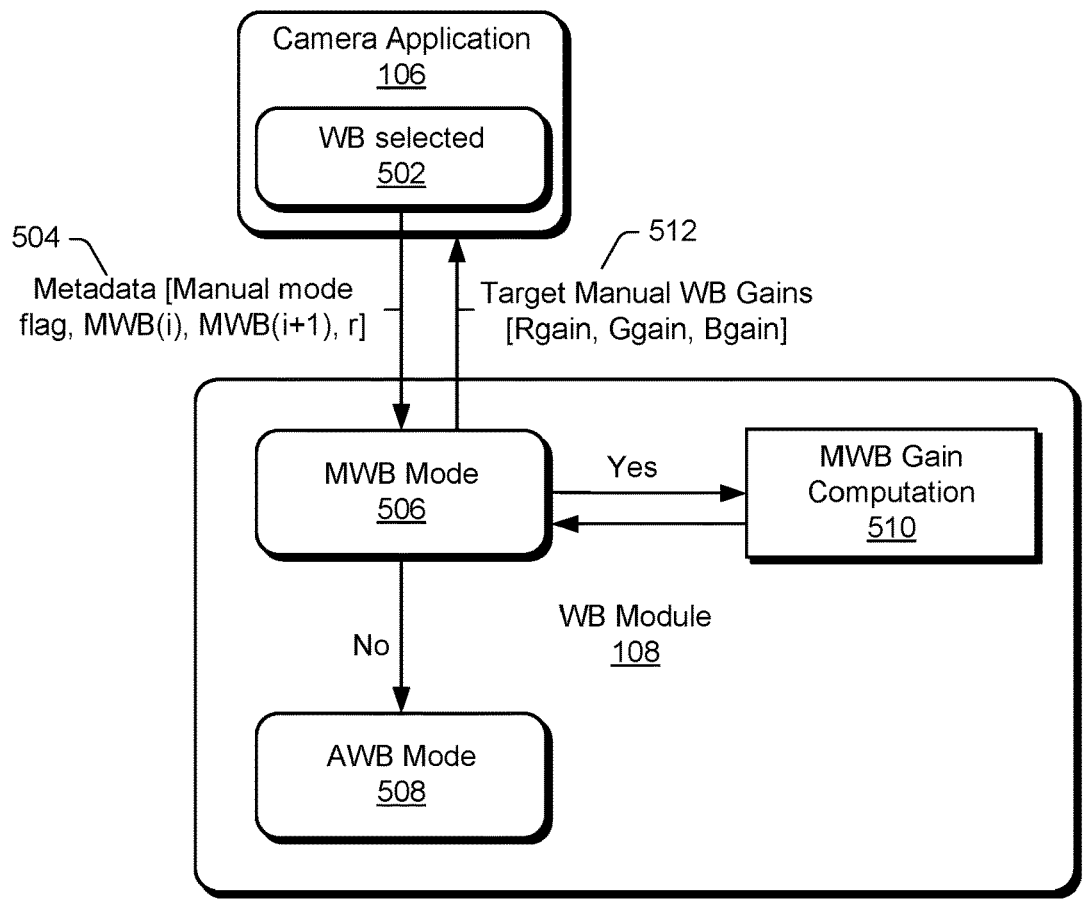

FIG. 5 depicts an example flowchart 500 of a feedback loop between a camera application and the WB module for an MWB selection between preset WB points. To implement the WB mode, a feedback loop may be applied between the camera application 106 and the WB module 108 of FIG. 1. At 502, WB is selected via the camera application 106. For example, the WB mode may have been selected or triggered by a user or a setting in the camera application 106. In an example, the user adjusts the location of the indicator 306 on the slider 304 presented via the camera UI 118.

The camera application 106 provides metadata (e.g., metadata 504), associated with the user-selected WB point 408 on the slider 304, to the WB module 108. If the location of the user-selected WB point 408 is between two presets 302, then the metadata 504 may include the two preset WB points (MWB(i) and MWB(i+1)) on opposing sides of the user-selected WB point 408. In aspects, the two preset WB points may be the two nearest presets on opposing sides of the user-selected WB point 408. The camera application 106 also provides a ratio r (e.g., the ratio 410) based on the location of the user-selected WB point 408 on the slider 304 with respect to the two nearest preset WB points. However, if the user selected one of the presets 302 (e.g., the location of the user-selected WB point 408 corresponds to a location of a preset 302), then the ratio 410 is zero (e.g., r=0) and the two nearest preset WB points are treated as a single point (e.g., MWB(i)=MWB(i+1)). In aspects, the metadata 504 also includes an indication (e.g., manual mode flag) of whether the manual WB mode is on or off.

Upon receiving the metadata 504, the WB-mode control 116 of the WB module 108 determines whether to compute the WB gains using a manual mode (e.g., MWB mode 506) or an auto mode (e.g., AWB mode 508). If the manual mode flag is on ("YES"), then the WB module 108 performs a manual WB gain computation 510 using the MWB mode 506 to compute target manual WB gains 512 based on the user-selected WB point 408 (e.g., via interpolation between the two preset WB points). However, if the manual mode flag is off ("NO"), then the WB module 108 computes WB gains using the AWB mode 508, which relies on conventional techniques for automatic WB gain computation.

The WB module 108 may output to the camera application 106 information, including the target WB gains for the user-selected WB point 408 (TMWB(Rgain, Ggain, Bgain)). The feedback communication between the WB module 108 and the camera application 106 may occur in real time to reduce latency and provide a user experience having a smooth WB transition process when sliding the indicator 306 along the slider 304.

Figure 6:
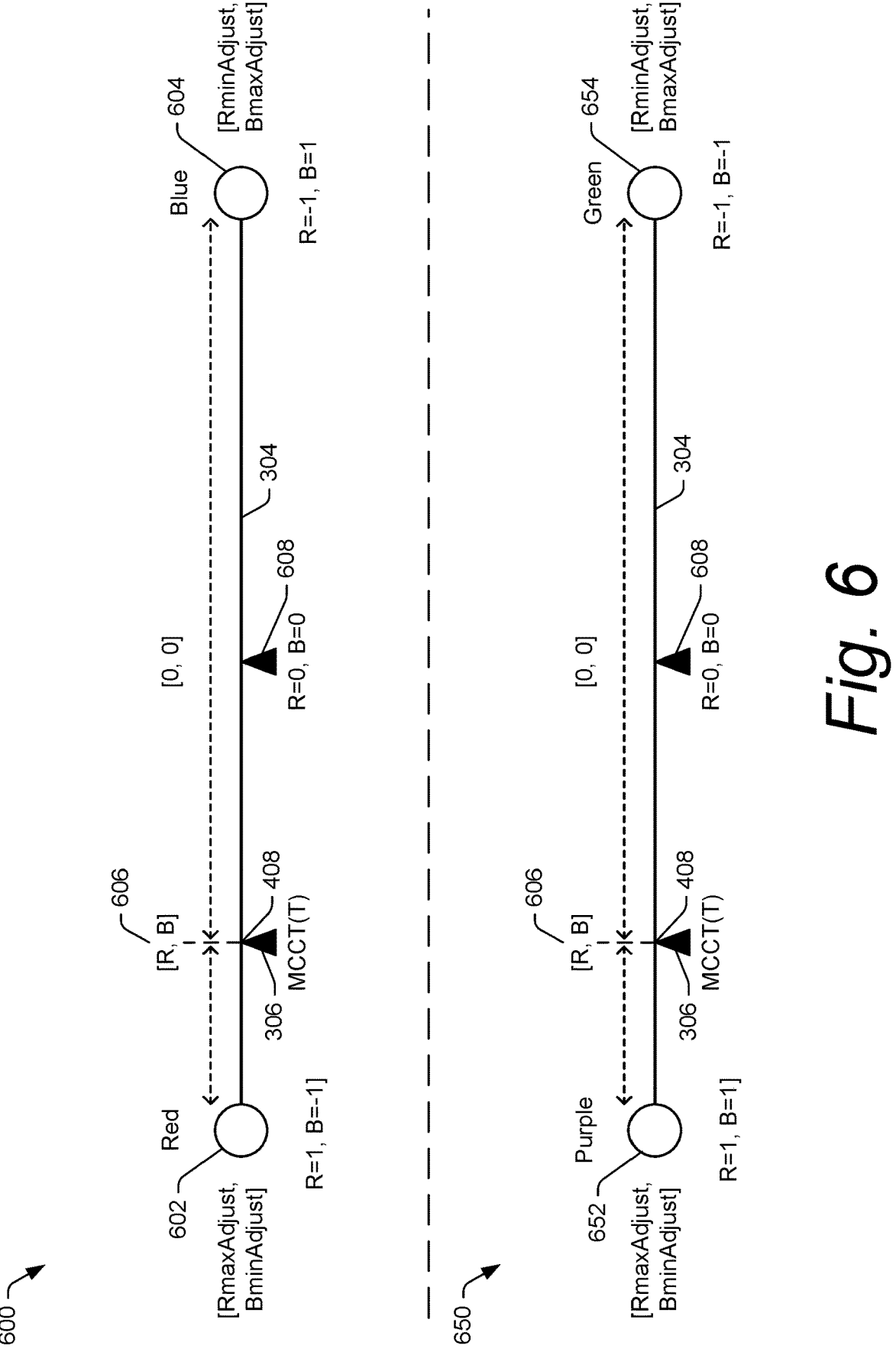
FIG. 6 illustrates example implementations of an HWB mode in a camera system of an electronic device.

FIG. 6 illustrates example implementations 600 and 650 of an HWB mode in a camera system of an electronic device. In FIG. 6, The HWB mode 114 involves using the automatic WB gain computation ("AWB decision") of the AWB mode 508 as a starting point of the manual WB gain computation 510 ("MWB gain computation 510"). For example, rather than predefine several preset WB illuminant points (e.g., presets 302), the manual adjustment of the white balance may be based on the AWB decision of a current frame (e.g., a current frame shown in the live-preview mode 110 of the camera application 106). The WB module 108 may then apply fine or "preference" color adjustment to achieve the user's preferred color.

Directions of color adjustment generally include directions between red and blue (e.g., implementation 600) and/or between purple and green (e.g., implementation 650). Color tone becomes warmer (e.g., higher color temperature) by sliding the indicator 306 in the red direction (e.g., toward a red end point 602) or the purple direction (e.g., toward a purple end point 652). The color tone becomes cooler (e.g., cooler color temperature) by sliding the indicator 306 in the blue direction (e.g., toward a blue end point 604) or the green direction (e.g., toward a green end point 654).

The WB algorithm to control this manual mode is based on the predefined preference color tuning ranges in red, blue, green, and/or purple color directions. The current frame's AWB decision is defined by [Rgain, Ggain, Bgain]. Example gain adjustment tuning parameters are defined in Table 2, where only Rgain and Bgain are to be adjusted. Based on the location of the user-selected WB point 408 on the slider 304 presented in the camera UI 118 of the camera application 106, different red and blue gain adjustments can be applied in the WB algorithm.

TABLE 2

| Preference Gain Adjustment Ranges | |
| --- | --- |
| Preference Gains | Gain Adjustment Range |
| Red Gain (Rgain) Adjustment Range | [RminAdjust, RmaxAdjust] |
| Blue Gain (Bgain) Adjustment Range | [BminAdjust, BmaxAdjust] |

In an example, if a user slides the indicator 306 toward the red end point 602, the WB module 108 applies a preference gain adjustment (e.g., [RgainAdjust, BgainAdjust]=[1.02, 0.98]) to achieve a warmer color cast. The strength of the warmer color cast depends on the user-selected WB point along the slider 304. If the user slides the indicator 306 all the way to the red end point 602, the preference gain reaches the maximum red adjustment and the minimum blue adjustment (e.g., [RmaxAdjust, BminAdjust]).

The camera UI 118 provides the location information of the user-selected WB point 408 on the slider 304 to enable the WB module 108 to provide preference-color adjusted gains. A distance from the center of the slider 304 to the two color ending points is defined with the location parameter [R, B] (e.g., MWB point location 606). The location information at a slider center point 608 is defined as [R=0, B=0]. The red end point 602 location information is defined as [R=1, B=−1], and the blue end point 604 location information is defined as [R=−1, B=1]. The purple and green slider may be similarly defined using [R=1, B=1] for the purple end point 652 location information and [R=−1, B=−1] for the green end point 654 location information. The location information on the sliders is summarized in Table 3:

TABLE 3

| Location Information on Sliders | | | |
| --- | --- | --- | --- |
| Slider Option | Left (or Top) Point | Center Point | Right (or Bottom) Point |
| Red/Blue Slider | [R = 1, B = −1] | [R = 0, B = 0] | [R = −1, B = 1] |
| Purple/Green Slider | [R = 1, B = 1] | [R = 0, B = 0] | [R = −1, B = −1] |

The camera UI 118 sends the MWB point location 606 [R, B] to the WB module 108 to compute the user-preferred WB gains. Preference-gain adjustment ranges are defined in WB tuning headers. Assume the current frame's AWB decision is [Rgain, Ggain, Bgain]. With this preference-color adjustment information (e.g., the MWB point location 606) sent from the camera UI 118, the WB module 108 can update the new gains by using the following, where $R \in [-1, 1]$ and $B \in [-1, 1]$:

$$Rgain(MWB) = Rgain * (1 + R * RmaxAdjust) \qquad \text{Equation 5}$$

$$Bgain(MWB) = Rgain * (1 + B * RmaxAdjust) \qquad \text{Equation 6}$$

Figure 7:
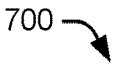
FIG. 7 depicts an example flowchart of a feedback loop between a camera application and the WB module for the HWB mode based on preference color adjustment.
Figure 7:
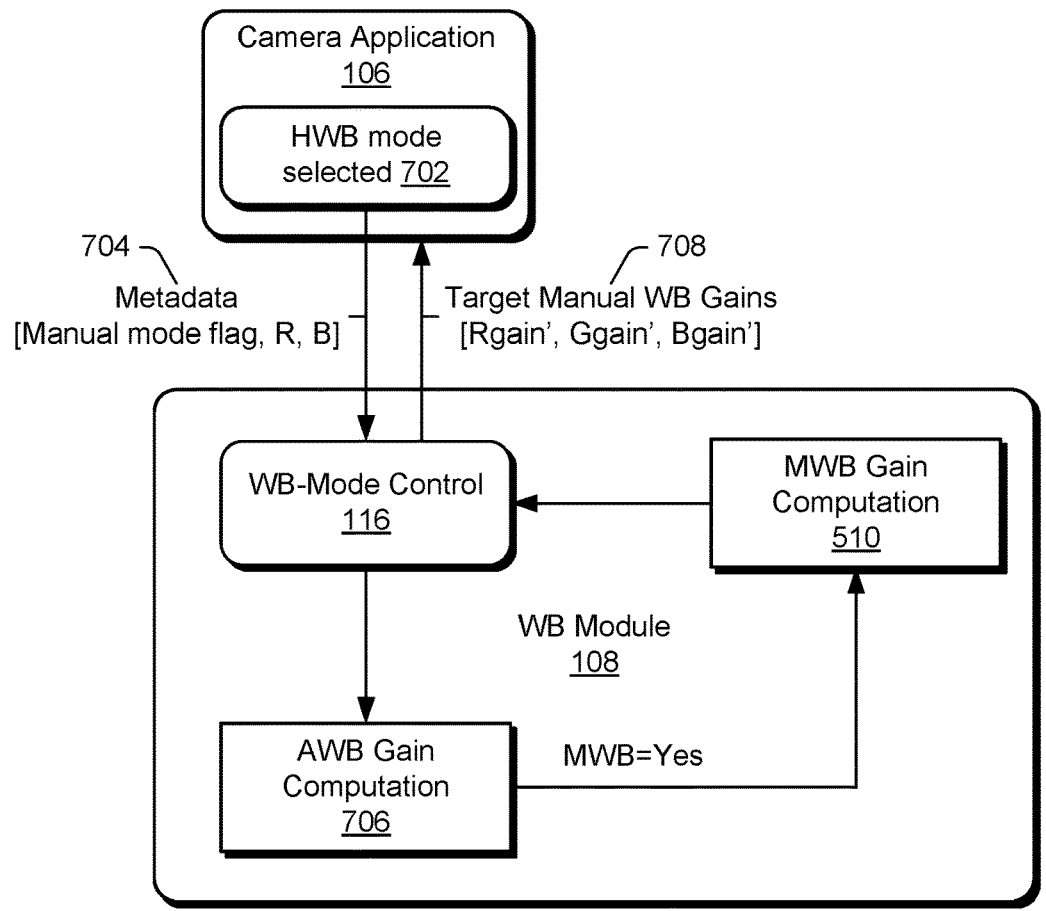

FIG. 7 depicts an example flowchart 700 of a feedback loop between a camera application and the WB module for the HWB mode based on preference color adjustment. To implement the MWB mode 506 described above, the feedback loop may be applied between the camera application 106 and the WB module 108 of FIG. 1, similar to the feedback loop of FIG. 5. At 702, hybrid WB is selected via the camera application 106. For example, the HWB mode 114 may have been selected or triggered by a user or a setting in the camera application 106. In an example, the user adjusted the location of the indicator 306 on the slider 304 presented via the camera UI 118.

The camera application 106 provides the location of the user-selected WB point 408 on the slider 304 (e.g., [R, B]). The camera application 106 provides metadata (e.g., metadata 704) to the WB module 108. The metadata 704 may include the red gain adjustment ratio R having a valid range of [−1, 1]. The metadata 704 may also include the blue gain adjustment ratio B having a valid range of [−1, 1]. In addition, the metadata 704 may include the manual mode flag, as described above.

The WB-mode control 116 triggers the WB module 108 to use the AWB mode 508 of the HWB mode 114 to compute an AWB gain computation 706 ("AWB decision") for a current frame of the live-preview mode 110 of the camera application 106. The AWB gain computation 706 for the current frame may then be used as a starting point (e.g., [R=0, B=0]) to perform the MWB gain computation 510, via the MWB mode 506 of the HWB mode 114, using the red gain adjustment ratio R and the blue gain adjustment ratio B in the metadata. The MWB gain computation 510 returns an output that is provided to the camera application 106, where the output includes the target manual WB gains 708 (e.g., TMWB(Rgain, Ggain, Bgain)) for the user-selected WB point 408. The feedback communication between the camera application 106 and the WB module 108 occurs in real time to reduce latency between the movement of the MWB control 112 and rendered results of corresponding color correction in the content displayed via the camera UI 118. Such real-time results provide a smooth WB transition process when the user moves the MWB control 112 in the camera application 106.

Figure 8:
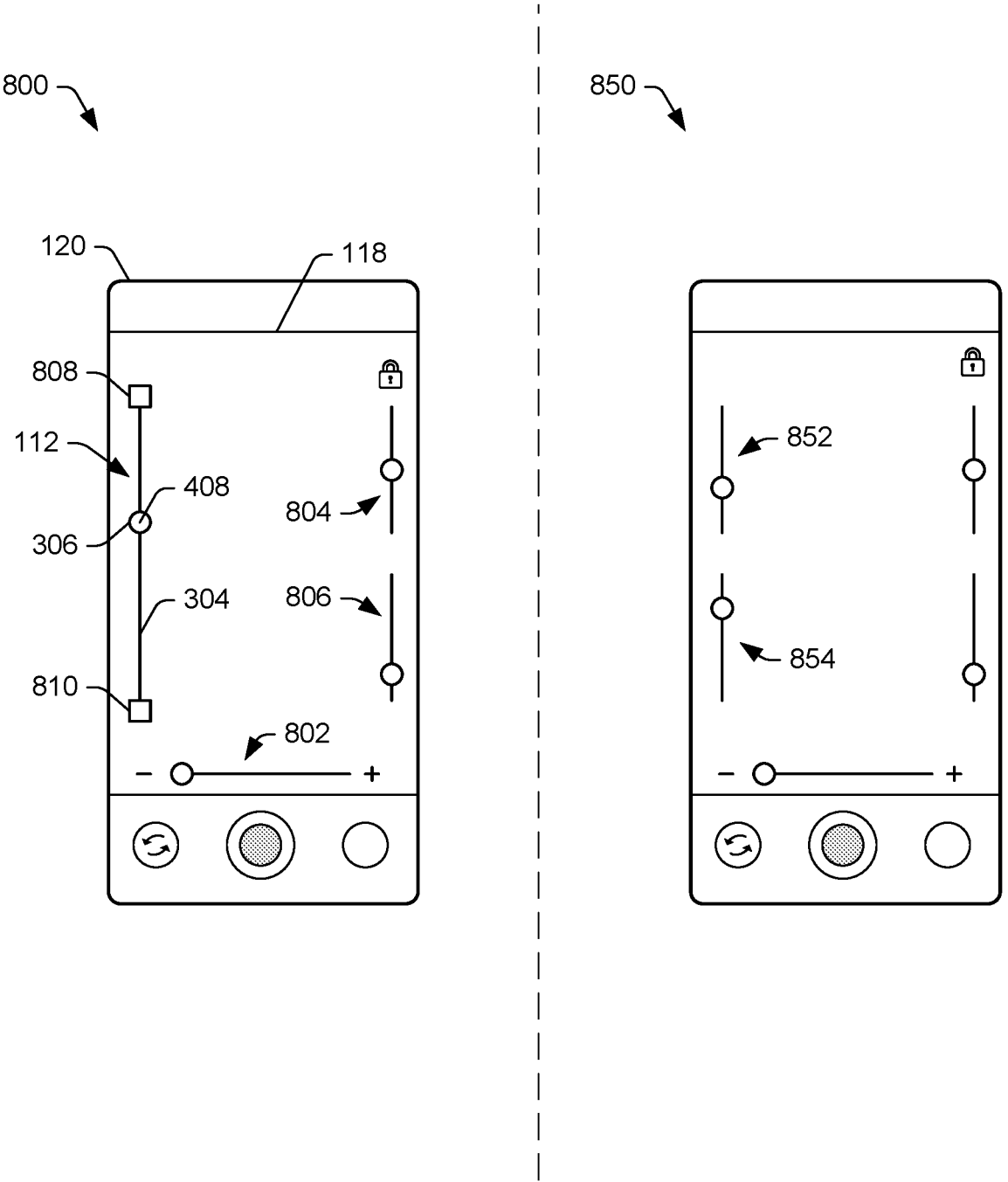
FIG. 8 illustrates examples of a camera UI having an MWB control for adjusting the WB of frames shown in a live-preview mode of a camera application on an electronic device.

FIG. 8 illustrates examples 800 and 850 of a camera UI having an MWB control for adjusting the white balance of frames shown in a live-preview mode of a camera application on an electronic device. In example 800, the camera UI 118 includes slider controls for adjusting different parameters of the camera system 104 or the camera application 106. The slider controls may include the MWB control 112, which may correspond to the slider 304 in FIGS. 3, 4, and 6. Additional slider controls may include an exposure control 802 to adjust the exposure of an image sensor of the camera system 104, a brightness control 804 to adjust brightness of the image or video, and a contrast control 806 to adjust the contrast of the image or video. Additional slider controls may also be implemented to enable manual adjustment of additional parameters of the camera system 104 or the camera application 106, including focus, zoom, saturation, hue, and so forth.

The MWB control 112 can be presented via the camera UI 118 in any suitable form. In the example 800, the MWB control 112 includes the slider 304 and multiple indicators on the slider 304. These indicators may include an upper bound 808, a lower bound 810, and the indicator 306 representing a user-selectable target WB point (e.g., the user-selected WB point 408). The slider 304 extends between the upper bound 808 and the lower bound 810. Each of the indicators 306, 808, and 810 can be a UI element, including an object, an icon, a symbol, a thumbnail image, and so forth. In one example, the upper bound 808 indicator includes a daylight icon to indicate to the user that moving the indicator 306 toward the upper bound 808 causes the color tones of the image to become warmer. In an example, the lower bound 810 indicator includes an incandescent light icon to indicate to the user that moving the indicator 306 toward the lower bound causes the color tones of the image to become cooler. As described in FIG. 3, presets 302 may exist between the upper bound 808 and the lower bound 810. One or more of the presets 302 may also be represented by a respective UI element positioned on the slider 304 of the MWB control 112. In aspects, the MWB control 112 may be displayed in the camera UI 118 in response to a user input that calls for the MWB control 112 to be displayed. The MWB control 112 may otherwise be hidden from the camera UI 118 to reduce screen clutter.

In example 850, the MWB control 112 includes two separate sliders: a first slider 852 and a second slider 854. The example 850 may correlate to the example implementations 600 and 650 described in FIG. 6. For instance, the first slider 852 may correlate to the example implementation 600, which enables manual WB adjustment between red and blue color tones. The second slider 854 may correlate to the example implementation 650, which enables manual WB adjustment between purple and green color tones. Alternatively, the first slider 852 may adjust white balance between purple and green color tones, while the second slider 854 adjusts the white balance between red and blue color tones.

By relying on preference color ranges defined in the WB tuning headers, rather than preset WB illuminant gains (e.g., presets 302), the MWB control (e.g., the MWB control 112, the first slider 852, or the second slider 854) may be displayed as a bar with an initial AWB decision located at the center of the bar. To provide an indication of color direction associated with each MWB control, colored sliders or objects (e.g., icons) may be implemented.

Figure 9:
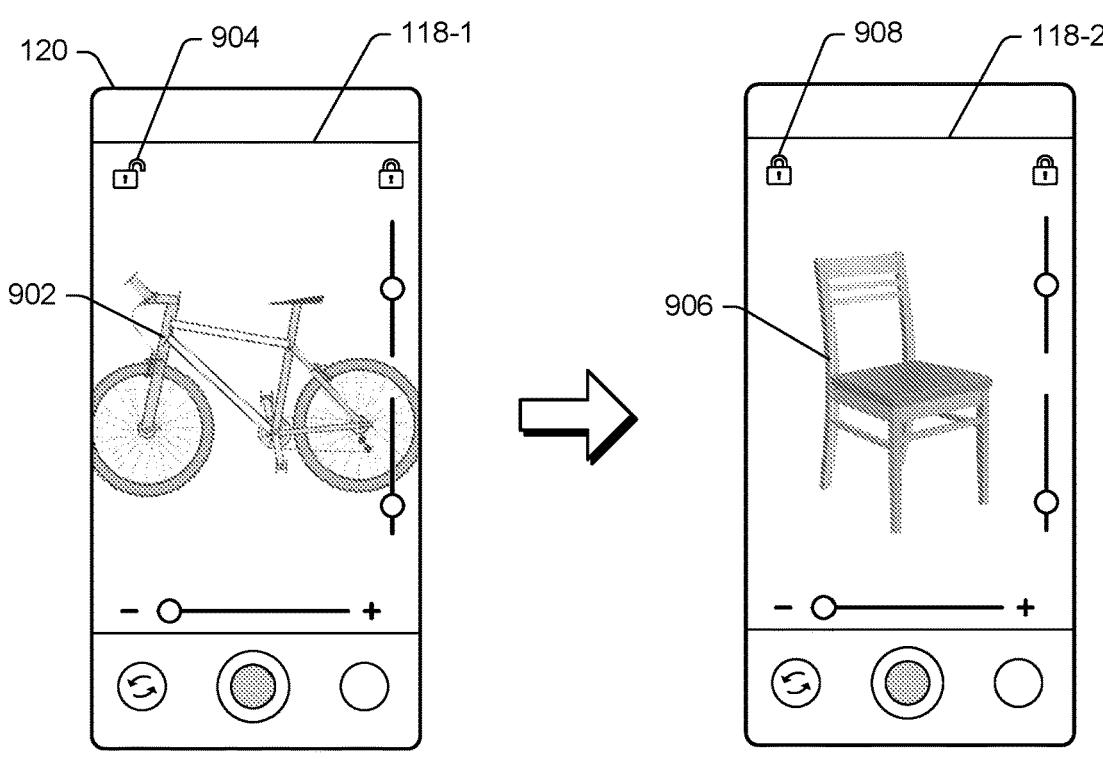
FIG. 9 illustrates an example implementation of a WB lock in a camera application of an electronic device.

FIG. 9 illustrates an example implementation 900 of a white-balance lock ("WB lock") in a camera application of an electronic device. For example, the WB module 108 from FIG. 1 may include a lock feature (e.g., WB lock), which is usable to lock the AWB gains and apply the locked AWB gains to subsequent frames in the live-preview mode 110.

Some target scenes may be challenging for the WB module 108 to provide an accurate AWB decision. These challenges may be due to various factors, including the scene's lighting conditions or the colors of objects in the scene. To increase accuracy, the user can point the camera of the electronic device 102 at a grey or white object under a similar illuminant to allow the WB module 108 to determine an AWB decision on the current frame, and then the user can select the WB lock to prevent further changes to the white balance. While the WB lock is enabled, the WB gains are not adjustable, neither automatically nor manually. Consequently, the user can point the camera to a target scene of interest, and the white balance remains unchanged from the AWB decision made for the grey or white object. In this way, the WB module 108 is not misled by one or more colors in the camera's field of view of the target scene.

Using the grey or white object can be useful if such an object is available, because accurate results can be obtained without the user making further manual adjustments to the white balance. Generally, the WB module 108 can automatically correct the scene illuminant by using a neutral color in the camera's field of view.

In the example illustrated in FIG. 9, the camera's field of view captures a scene having a neutral-color bicycle 902 and displays the scene in a live-preview mode of the camera UI 118 (e.g., camera UI 118-1). The WB module 108 automatically determines the WB gains according to the neutral-color bicycle 902 (or according to a neutral-color wall behind the bicycle). To maintain the determined WB gains, the user can provide input to lock the WB gains. For example, a UI element (e.g., icon 904) may be selected by a user input to initiate the WB lock. In the illustrated example, the icon 904 may be an unlocked lock indicating that the current WB gains are not yet locked.

Subsequent to the user input locking the WB gains, the user moves the camera field of view to target another object of interest (e.g., a chair 906 shown in camera UI 118-2), which may be under the same illuminant. Accordingly, the same WB gains determined for the bicycle 902 are now applied to the capture of the chair 906, regardless of how challenging the scene content is for the WB module 108. In addition, the icon 904 can change (e.g., to icon 908) to indicate that the WB gains are locked in place. In this example, the icon 908 is a locked lock. Because this example relies on the WB module 108 operating in the AWB mode, the MWB control 112 is not displayed. However, the lock feature described herein can be implemented in conjunction with the MWB control 112 to prevent unwanted adjustment of the WB gains through inadvertent user input to the MWB control 112.

Figure 10:
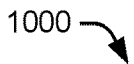
FIG. 10 depicts an example flowchart of communication between the camera application and the WB module in relation to the WB lock.
Figure 10:
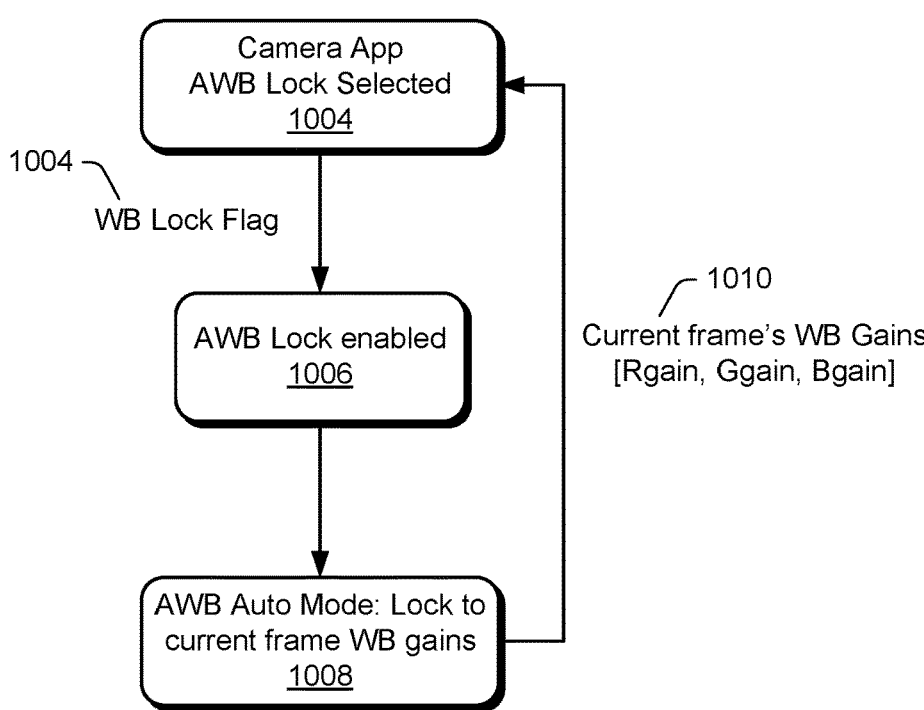

FIG. 10 depicts an example flowchart 1000 of communication between the camera application 106 and the WB module 108 in relation to the WB lock. After the WB module 108 calculates an AWB decision for a current frame (e.g., a first frame), then at 1002, a user input selects the WB lock via the camera UI 118. In response to user selection of the WB lock for the current frame, the camera application 106 passes a WB lock flag 1004 to the WB module 108 and, at 1006, the WB lock is enabled. At 1008, the AWB auto mode locks to the current frame WB gains. In this way, the WB module 108 skips the AWB calculation of frames subsequent to the current frame and maintains the current frame's WB gains [Rgain, Ggain, Bgain] until the WB lock is disabled. The WB module 108 returns the current frame's WB gains 1010 to the camera application 106.

Figure 11:
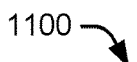
FIG. 11 depicts a flowchart of a communication between the camera application and the WB module to implement touch WB.
Figure 11:
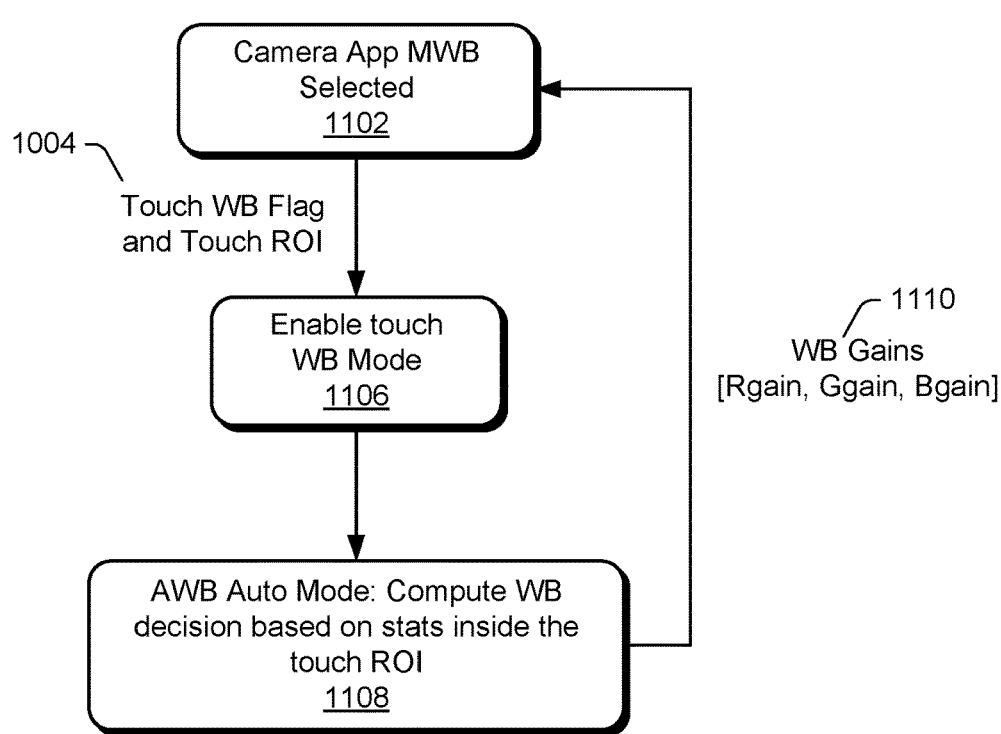

FIG. 11 depicts a flowchart 1100 of a communication between the camera application 106 and the WB module 108 to implement a touch-WB variant of the MWB mode 506. In accordance with touch WB, when the user touches the display device 120, a touch region of interest (ROI) is defined. Then, in some instances, ROI information (e.g., sensor coordinate (x, y, dx, dy) on which the touch ROI is defined) is sent to the WB module 108, and the WB module 108 uses RGB information only corresponding to the touch ROI to compute the AWB decision for the entire frame.

In many camera applications on touchscreen devices, the default touch action (e.g., tap) in the camera UI 118 may trigger touch auto-focus and touch auto-exposure. Thus, it may be useful for the user to have pre-knowledge on selecting a neutral object for white balancing the scene illuminant. To avoid user confusion with conventional touch gestures in many camera applications, the touch WB may be triggered separately from touch auto-focus and touch auto-exposure. Accordingly, the touch WB may be enabled in response to an explicit user input that enables touch input to adjust white balance and disabled at other times by default.

At 1102, a manual WB mode (specifically, touch WB) is selected via the camera UI 118. The camera application 106 passes touch ROI information 1104 of a user touch to the WB module 108. The touch ROI information 1104 may include a touch WB flag and touch-WB ROI. In particular, the touch-WB ROI includes the ROI information. In response to receiving the touch ROI information having the touch WB flag, the WB module 108, at 1106, switches the MWB mode 506 to the touch WB. The touch WB enables a touch pipeline separate from touch focus and touch exposure. For example, by activating the touch WB of the MWB mode 506, the user can touch a location on the camera UI 118 to be used for the AWB decision without activating or causing a change to the auto focus and/or the auto exposure.

At 1108, the WB module 108 computes a final AWB decision of the frame based on RGB information within the touch ROI. In this way, the WB module 108 uses the AWB mode to compute the AWB decision based on the information obtained from the MWB mode (e.g., the touch-WB variant). The WB module 108 then passes the final AWB decision (e.g., WB gains 1110 [Rgain, Ggain, Bgain] based on the RGB information located inside the touch ROI) to the camera application 106 for color correction.

Figure 12:
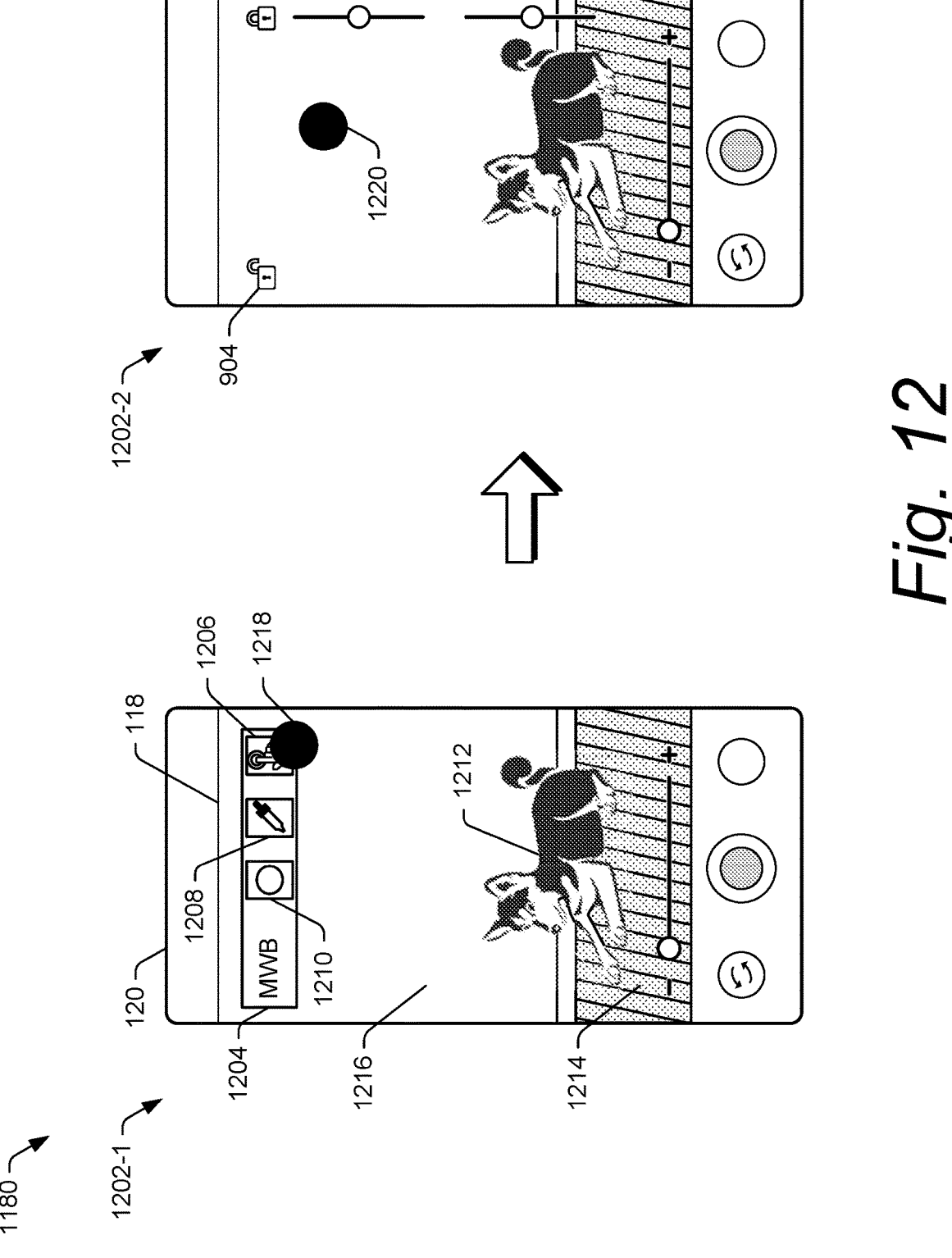
FIG. 12 illustrates an example implementation of initiating a touch-WB variant of the MWB mode via the camera UI of the camera application.

FIG. 12 illustrates an example implementation 1200 of initiating a touch-WB variant of the MWB mode 506 via the camera UI 118 of the camera application 106. In aspects, the MWB control 112 may provide selectable options, via the camera UI 118, to enable the user to select a particular MWB mode from a plurality of MWB-mode variants. Some example MWB-mode variants include a touch-WB variant, a preset-illuminants variant, and a preference-color variant. The selectable objects, when selected by a user input, may initiate a corresponding MWB-mode variant. For example, in instance 1202-1, the camera UI 118 provide a UI element 1204 having selectable options including a first icon 1206 (e.g., touch icon), a second icon 1208 (e.g., preference-color icon), and a third icon 1210 (e.g., preset-colors icon). The first icon 1206 may correspond to the touch-WB variant of the MWB mode 506. The second icon 1208 may correspond to the preference-color variant of the MWB mode 506. The third icon 1210 may correspond to the preset-illuminants variant of the MWB mode 506. The MWB control 112 can be provided in any suitable way, including via a dropdown menu, a popup window, or an overlay. Further, the MWB control 112 may be accessible via the settings of the camera application 106.

In the instance 1202-1, the user directs the camera toward their dog 1212, sitting on a floor 1214 in front of a wall 1216. The camera UI 118 is currently showing a live preview of the scene of the dog 1212. The HWB mode 114 described herein enables the user to control color correction, via a WB adjustment, to the frames shown in the live-preview mode 110 of the camera application 106.

In the instance 1202-1, the user touches (e.g., touch 1218) the first icon 1206, which triggers initiation of the touch-WB variant of the MWB mode 506. In response, the camera application 106 switches to the touch-WB variant. In some cases, the MWB control 112 is removed from the camera UI 118 in response to the touch 1218 to reduce screen clutter. In another example, the display of the MWB control 112 remains. Because the user has selected the touch-WB variant, the electronic device 102 does not perform an AWB decision until after receiving an explicit user input that selects an ROI on the display device 120. In instance 1202-2 of the illustrated example, the user input (e.g., touch 1220) selects the wall 1216 behind the dog 1212 because the wall has a neutral color. The WB module 108 then performs an AWB decision using RGB information only within a region (e.g., the touch ROI) of the display device 120 touched by the user's finger. Using the AWB decision, the camera application 106 can adjust the white balance of the subsequent frames shown in the live-preview mode 110 and, consequently, in a captured image or video captured by the camera system 104 for persistent storage. In addition, the camera UI 118 can provide a lock option (e.g., the WB lock described in FIG. 9) by displaying the icon 904, which is selectable by the user to lock the WB gains. Then, the user can move the camera's field of view to capture an image or video of a different object (not shown), and the camera system 104 uses the same WB gains as those calculated based on the selection of the wall 1216.

Figure 13:
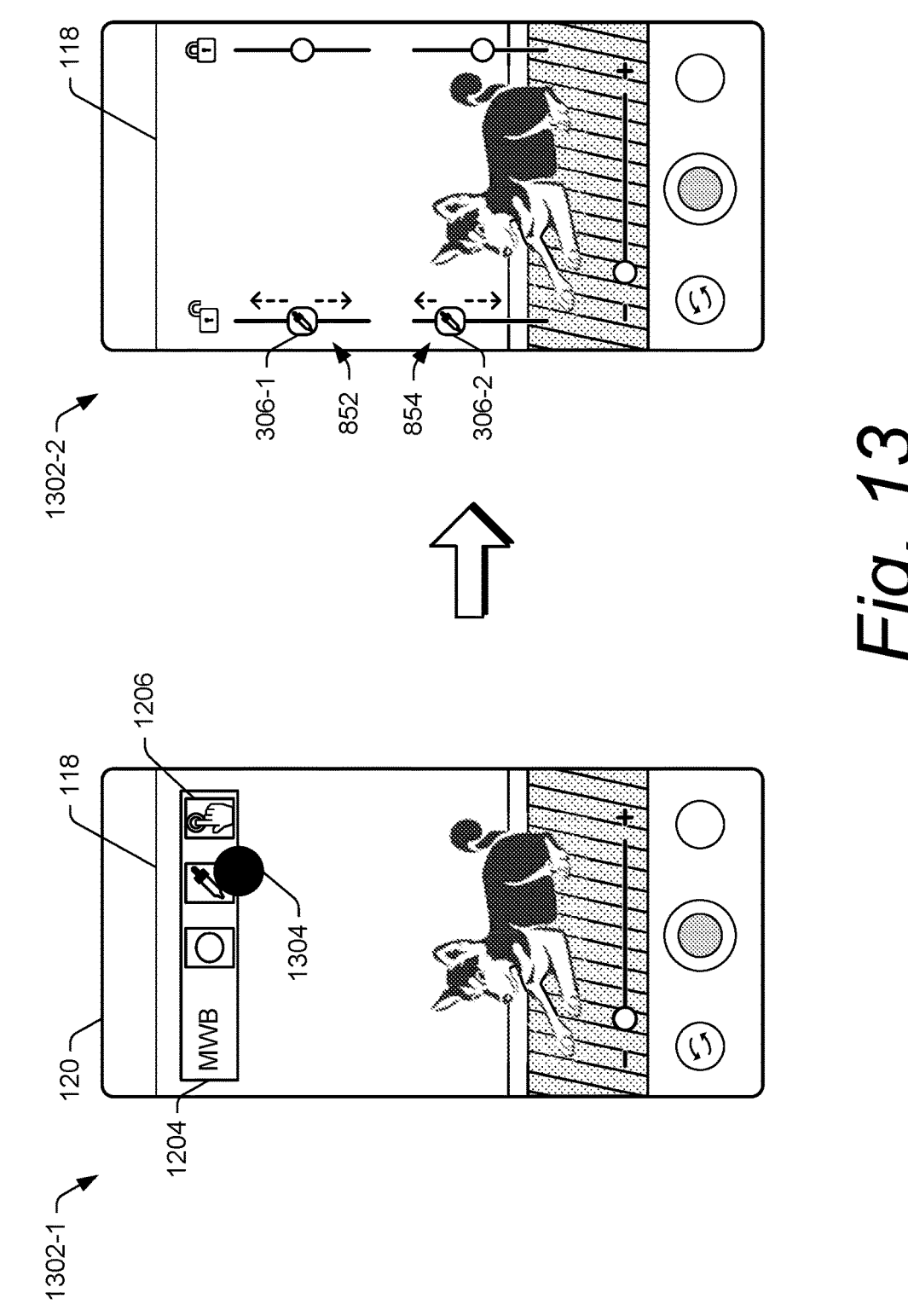
FIG. 13 illustrates an example implementation of selecting a preference-color mode-variant of the MWB mode via the camera UI of the camera application.

FIG. 13 illustrates an example implementation 1300 of selecting a preference-color variant of the MWB mode 506 via the camera UI 118 of the camera application 106. In instance 1302-1, a user input (e.g., touch 1304) selects, via the UI element 1204, the second icon 1208, which corresponds to the preference-color variant of the MWB mode 506. In response to the selection of the second icon 1208, the camera application 106, in instance 1302-2, provides one or more WB sliders (e.g., the first slider 852 and/or the second slider 854) via the camera UI 118 to enable the user to manually adjust the white balance of the frames shown in the live-preview mode by moving the indicator(s) (e.g., indicators 306-1 and 306-2) on the WB slider(s) (e.g., the sliders

852 and 854). Then, as described above, the camera application determines the location of the indicators 306-1 and 306-2 on the WB slider(s) 852 and 854 and passes that location information to the WB module 108. The WB module 108 calculates the AWB decision based on the location information and returns the AWB decision (e.g., WB gains) to the camera application 106 for color correction.

Figure 14:
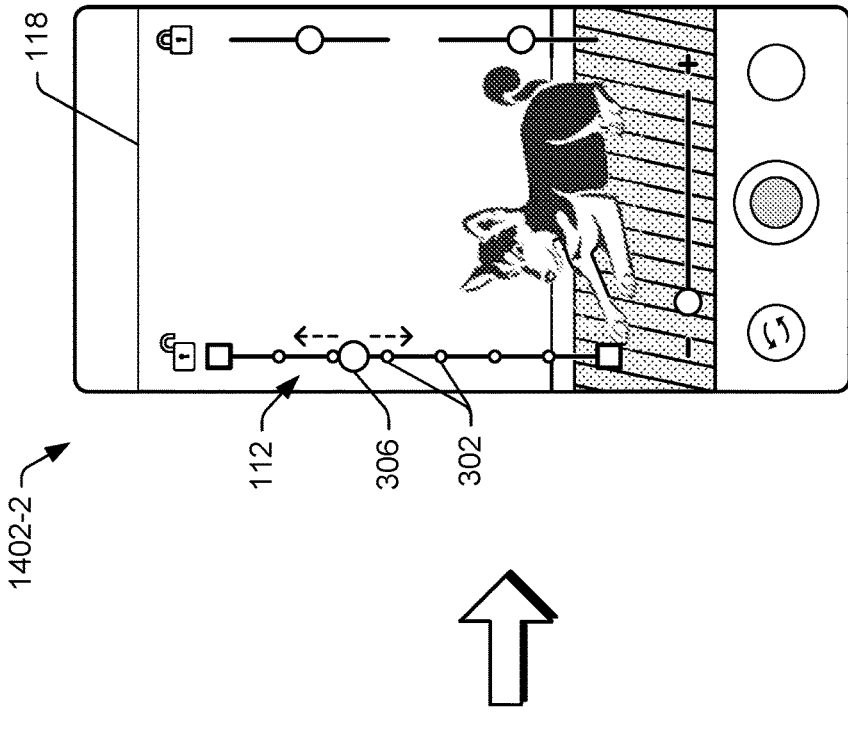
FIG. 14 illustrates an example implementation of selecting a preset-illuminants variant of the MWB mode via the camera UI of the camera application.
Figure 14:
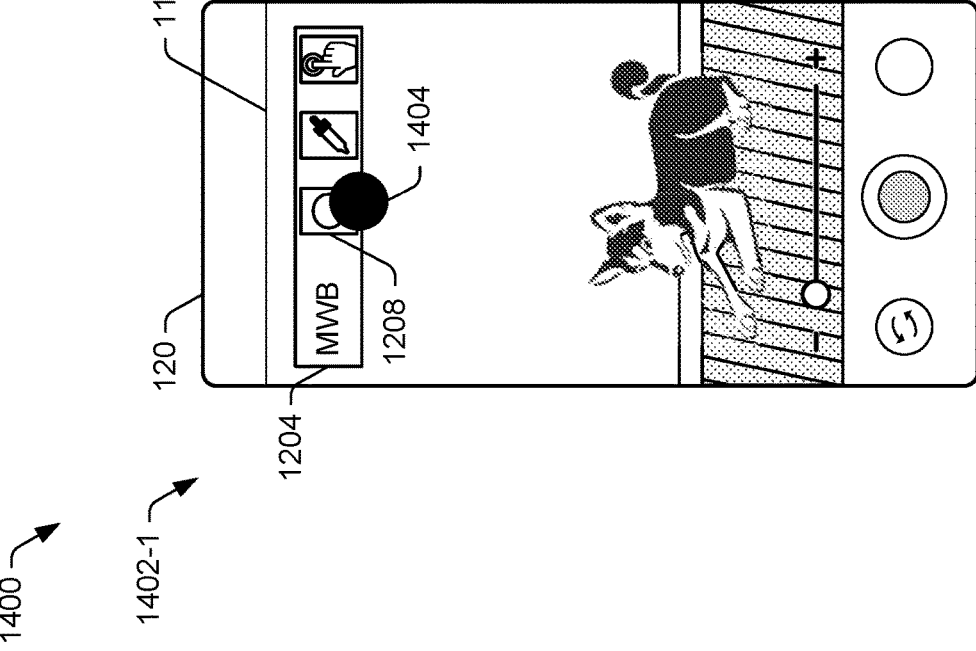

FIG. 14 illustrates an example implementation 1400 of selecting a preset-illuminants variant of the MWB mode via the camera UI of the camera application. In instance 1402-1, the user input (e.g., touch 1404) selects, via the UI element 1204, the third icon 1210, which corresponds to the preset-illuminants variant of the MWB mode 506. In response to the selection of the third icon 1210, the camera application 106, in instance 1402-2, provides one or more WB controls (e.g., the MWB control 112) via the camera UI 118 to enable the user to manually adjust the white balance of the frames shown in the live-preview mode by moving the indicator 306 on the MWB control 112. Then, as described above, the camera application 106 determines the location of the indicator 306 on the MWB control 112, such as by interpolation between the nearest preset illuminant points (e.g., presets 302) on opposing sides of the indicator 306. The WB module 108 calculates the AWB decision based on the interpolation of the preset manual WB gains corresponding to the presets 302 and returns the AWB decision to the camera application 106 for color correction.

Figure 15:
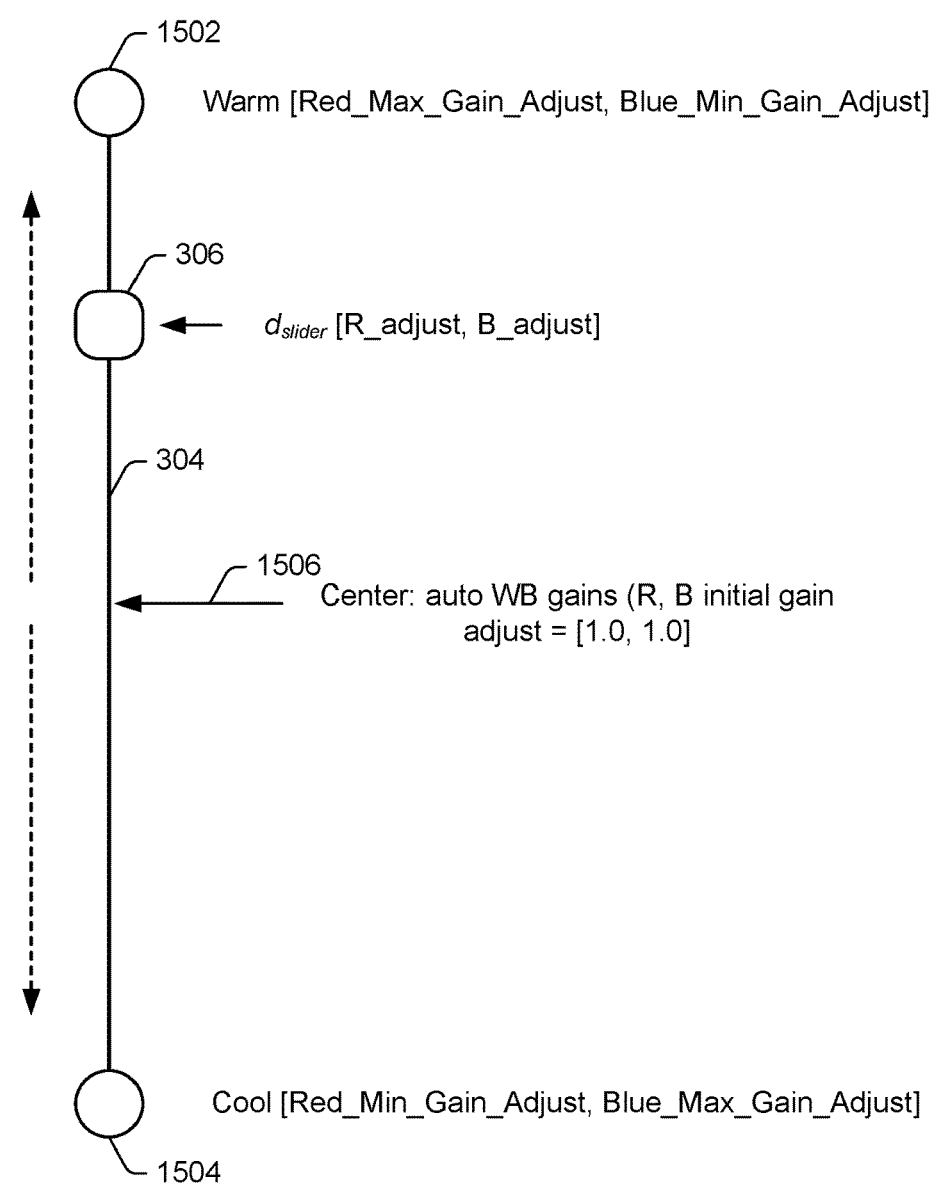
FIG. 15 illustrates an example implementation of an MWB adjustment by preference gains.

FIG. 15 illustrates an example implementation 1500 of an MWB adjustment by preference gains. Similar to the implementation 600 in FIG. 6, the implementation 1500 includes an MWB slider (e.g., slider 304) with two end points (e.g., red end point 1502, blue end point 1504). In FIG. 15, the end points 1502 and 1504 correspond to tunable red and blue adjustments, respectively. A preference color adjustment look-up-table (LUT) may be implemented in the tuning header and enable maximum red and blue gains (e.g., the red end point 1502 and the blue end point 1504, respectively) to be tunable. In aspects, the red and blue end points 1502 and 1504 of the slider 304 are tunable to provide either full coverage of the illuminant range or only a portion of the illuminant range. The MWB control 112 is based on the AWB gains, which enables the user to return the manually adjusted WB gains to the original AWB decision. For example, the AWB decision is used to define the center (e.g., slider center 1506) of the WB slider 304 (e.g., slider center 1506 is defined as R, B initial gain adjust=[1.0, 1.0]). The gain adjustment LUT, which may be defined in Table 4, is used to define boundary settings of the MWB control 112:

TABLE 4

| Manual WB Preference Gain Adjustment Range | | |
|---|---|---|
| Slider Preference Gains Definition | Gain Adjustment Range (r_adjust, b_adjust) | Slider Distance Value (d_slider) |
| Slider Top Preference Gain Adjustment | [Red_Max_Gain_Adjust, Blue_Min_Gain_Adjust] | 1.0 (float) |
| Slider Center | [1.0, 1.0] | 0.0 |
| Slider Bottom Preference Gain Adjustment | [Red_Min_Gain_Adjust, Blue Max_Gain Adjust] | −1.0 (float) |

Based on the user-selected location of the indicator 306 on the WB slider 304 in the camera UI 118, different red and blue gain adjustments are applied by the WB module 108. To compute the real-time MWB gains and provide an output to the images or video displayed in the camera preview (e.g., the live-preview mode 110 of the camera application 106), the information that indicates the location of the user-selected indicator 306 on the WB slider 304 is passed from the camera UI 118 to the WB module 108. If the location of the indicator 306 is defined as a floating value $d_{slider} \in$ [−1, 1], it can be illustrated on the slider 304 in FIG. 15. Corresponding values of the location of the indicator 306 are shown in the third column (e.g., "Slider Distance Value") of Table 4.

Using the location $d_{slider}$, the WB module 108 can look up the preference gain adjustment table defined in the tuning header and locate the corresponding gain adjustment values to compute the current MWB gains. Note that the maximum and minimum preference gain adjustment values are tunable based on the needs of each camera sensor. The maximum and minimum preference gain values (e.g., red end point 1502, blue end point 1504) are defined as [$R_{max}$, $B_{min}$], [$R_{min}$, $B_{max}$], respectively. When the WB module 108 receives the location $d_{slider}$, the corresponding adjustment gain [$R_{adjust}^{MWB}$, $B_{adjust}^{MWB}$], for target red and blue gains, respectively, can be computed using the following:

$$\text{If } d_{slider} > 0, \qquad \text{Equation 7}$$
$$R_{adjust}^{MWB} = 1.0 + d_{slider} * (R_{max} - 1.0)$$
$$B_{adjust}^{MWB} = 1.0 + d_{slider} * (B_{min} - 1.0)$$
$$\text{If } d_{slider} < 0,$$
$$R_{adjust}^{MWB} = 1.0 + d_{slider} * (R_{min} - 1.0)$$
$$B_{adjust}^{MWB} = 1.0 + d_{slider} * (B_{min} - 1.0)$$
$$\text{If } d_{slider} = 0,$$
$$R_{adjust}^{MWB} = 1.0$$
$$B_{adjust}^{MWB} = 1.0$$
$$\text{Note}: R_{max} \geq 1.0,\, 0 < B_{min} \leq 1;\, B_{max} \geq 1.0,\,\, 0 < R_{min} \leq 1$$

When the WB gain changes, the corresponding CCT and color-correction matrix (CCM) may also change. For manual mode, depending on the maximum gain adjustment range, the new CCT and CCM may be computed together.

In some implementations, a smaller range between the red and blue end points of the slider 304 may enable finer adjustment of the white balance, whereas a larger range enables a coarser adjustment of the white balance. Accordingly, the sensitivity of the WB slider 304 can be adjusted by defining the respective end points of the WB slider 304. For example, the sensitivity of the WB slider 304 can be increased by increasing the range between the red and blue end points on the slider 304. Alternatively, the sensitivity of the WB slider 304 can be decreased by decreasing the range between the red and blue end points on the slider 304.

Figure 16:
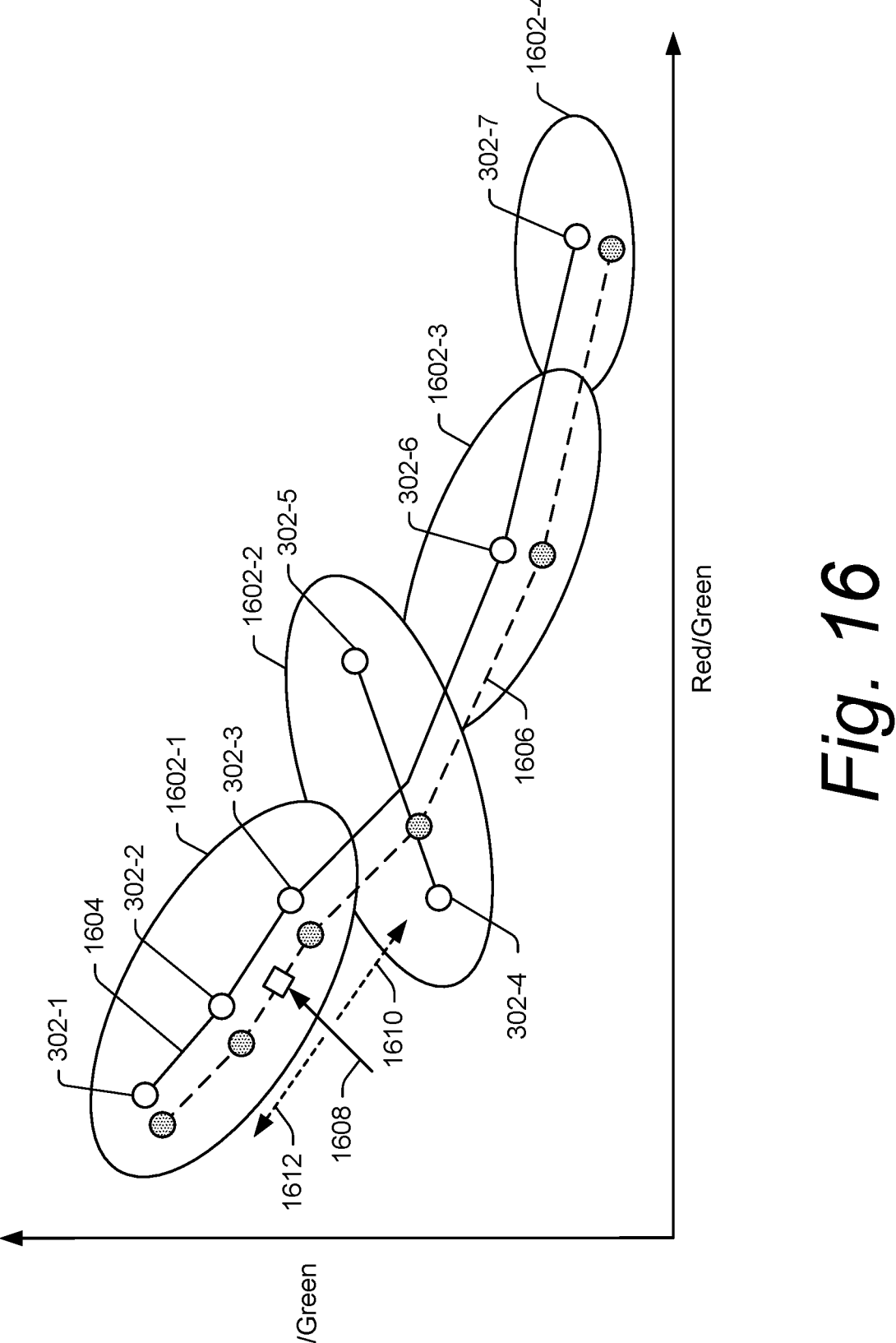
FIG. 16 illustrates an example plot of a color-correction temperature range for preference gain adjustment.

FIG. 16 illustrates an example plot 1600 of a color-correction temperature range for preference gain adjustment. In aspects, the CCT range includes full coverage of an illuminant range. However, the CCT range may be bounded to include only a portion of the full illuminant range. The illuminant range includes sub-ranges 1602 corresponding to at least some of the preset WB points (e.g., the presets 302) and correlated color temperatures described above in Table 1. Any suitable number and size of sub-ranges 1602 can be used to represent portions of the illuminant range. In the illustrated example, the plot 1600 includes a first range 1602-1, a second range 1602-2, a third range 1602-3, and a fourth range 1602-4. The first range 1602-1 may be defined as a range around calibrated reference points (e.g., calibrated by lab-standard illuminants) and reference lines, including the presets shade 302-1, cloudy 302-2, and outdoor 302-3. The second range 1602-2 may be defined as a range around calibrated reference points and reference lines, including the presets fluorescent 302-4 and warm fluorescent 302-5. The third range 1602-3 may be defined as a range around calibrated reference points and reference lines including the preset incandescent 302-6. The fourth range 1602-4 may be defined as a range around calibrated reference points and reference lines including the preset horizon 302-7.

Conventional camera systems may use only the preset gains (e.g., presets 302). However, the preset gains may not match the true real-world illuminant, which may result in some color cast even when using a manual WB adjustment. Such issues may reduce the effectiveness of the manual WB adjustment. To address this issue, the color-correction algorithm used by the WB module 108 is based on the current AWB decision and may still cover the entire illuminant range. In this way, the WB slider 304 is centered on the current AWB decision, and the user may slide the indicator 306 on the WB slider 304 to achieve different color appearances. This approach enhances the accuracy of the color correction over conventional techniques that just rely on the presets 302.

A centerline 1604 represents a pre-calibrated line between the presets 302. A reference CCT line 1606 (represented by a dashed line) is a calibrated line that is parallel to the centerline 1604 but for visual clarity is illustrated as being offset from the centerline 1604. Based on current illuminant characteristics, the WB module 108 computes in real time the AWB decision (e.g., AWB decision 1608) and how it relates to a calibrated center illuminant. The center illuminant is based on the highest color temperature and the lowest color temperature. Sliding the indicator 306 on the WB slider 304 in FIG. 15, for example, toward the red end point 602 moves the WB gains along the reference CCT line 1606 in a first direction 1610 and adjusts to a warmer color tone. Sliding the indicator 306 on the WB slider 304 toward the blue end point 604 moves the WB gains along the reference CCT line 1606 in a second direction 1612, opposite the first direction 1610, on the WB slider 304 and adjusts to a cooler color tone.

Figure 17:
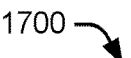
FIG. 17 depicts a flowchart of an HWB mode by preference color adjustment.

FIG. 17 depicts a flowchart 1700 of an HWB mode by preference color adjustment. At 1702, the camera application 106 determines metadata 1704 associated with the indicator 306 on the MWB control 112 (e.g., WB slider 304) in the camera application 106. The camera application 106 sends the metadata 1704 to the WB module 108. The metadata 1704 includes location information (e.g., float value $d_{slider}$) for the indicator 306 on the WB slider 304 relative to a center (e.g., the slider center 1506) of the WB slider 304. The metadata 1704 may also include a manual mode flag, as described above.

At 1706, the WB-mode control 116 of the WB module 108 receives the metadata 1704 from the camera application 106 and uses the metadata 1704 to determine whether to proceed with the AWB mode 508 or the MWB mode 506 for computation of the WB gain adjustments.

At 1708, the WB module 108 determines if the MWB mode 506 is enabled based on the manual mode flag included in the metadata 1704. If the MWB mode 506 is enabled ("YES" at 1708), then at 1710, the WB module 108 performs a manual WB computation using the location information in the metadata 1704. If, however, the MWB mode 506 is disabled ("NO" at 1708), then at 1712, the WB module 108 uses an AWB mode 508 to perform an auto WB computation based on characteristics of a current frame. Then at 1714, the WB module provides an output (e.g., WB gains [Rgain, Ggain, Bgain], CCT, CCM) to the camera application 106 to enable the camera application 106 to adjust the WB gains for the frames in the live-preview mode 110.

Figure 18:
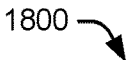
FIG. 18 illustrates an example method of implementing the MWB control from FIG. 1 in a preview mode of a camera system of an electronic device.

FIG. 18 illustrates an example method 1800 of implementing the MWB control 112 from FIG. 1 in a preview mode of a camera system of an electronic device. In the illustrated example, the electronic device 102 provides a colored slider 1802 in the camera preview of a camera application rendered on the display device 120. The colored slider 1802 is dedicated for manual WB adjustment and is an instance of the slider 304. In aspects, the colored slider 1802 is provided in a vertical orientation. However, the colored slider 1802 may be presented in a horizontal orientation or a diagonal orientation. The color toward the top (e.g., top end 1804) of the colored slider 1802 may be rendered with a warm color (e.g., orange, red) to indicate a warmer color tone adjustment direction 1806. The color toward the bottom (e.g., bottom end 1808) of the colored slider 1802 may be rendered with a cool color (e.g., blue) to indicate a cooler color tone adjustment direction 1810. In aspects, the color of the colored slider 1802, between the top end 1804 and the bottom end 1808, may gradually change from substantially blue to substantially red (or substantially orange) to visually indicate a correlation between the color tone adjustment and the position of the indicator 306 on the colored slider 1802. In another example, the color of the colored slider 1802 may change in a stepwise fashion. In this way, the user can intuitively understand the functionality of the WB slider (e.g., the correlation between the location of the indicator and the resulting color-tone effects on the preview image) without having prior knowledge of CCT or how to use the CCT for WB adjustment. Rather, the warmer and cooler color directions for MWB adjustment provide the user with an immediate impression of how to change the color appearance.

In aspects, the CCT also changes based on the gain adjustment change. For example, sliding the indicator 306 toward the warmer direction moves the white balance to the higher CCT direction, and sliding the indicator 306 toward the cooler direction moves the white balance to the lower CCT direction.

Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, including, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Some examples are described below:

A method for a hybrid white-balance mode in a camera application of an electronic device, the method comprising: presenting, during a live-preview mode of the camera application, a MWB control on a camera user interface displayed on a display device of the electronic device, the MWB control configured to enable user selection of a white-balance setting for performing a manual adjustment on a white balance with respect to a current frame presented in the live-preview mode of the camera application; determining, using an auto-white-balance auto mode, an auto-white-balance decision on a red-green-blue, RGB, scale for the current frame based on one or more characteristics of the current frame; receiving a user input that adjusts the manual-white-balance control displayed in the camera user interface; determining, using an auto-white-balance manual mode, target white-balance gains for a white-balance adjustment of the current frame based on the user input to the white-balance control and relative to the auto-white-balance decision, the auto-white-balance decision used as initial white-balance gains to determine the target white-balance gains that correspond to the user input to the manual-white-balance control; and applying the target white-balance gains to the current frame presented in the live-preview mode of the camera application for color correction.

The determining the white-balance adjustment may include using a look-up-table defined to perform white-balance gain adjustments.

The look-up-table may define values for an upper bound, a lower bound, and a center point corresponding to the manual-white-balance control.

The white-balance gain adjustments may include a red gain adjustment and a blue gain adjustment.

The upper bound and the lower bound may be tunable based on one or more parameters of the camera system.

The manual-white-balance control may comprise a slider extending between the upper bound and the lower bound.

The method may further comprise: determining location information associated with a user-selected indicator on the slider relative to a center of the slider; passing the location information from the camera user interface to a white-balance module to compute the target white-balance gains in real time; and computing, by the white-balance-module, the target white-balance gains for the manual-white-balance adjustment by using the location information with the look-up-table to reference corresponding gain adjustment values.

The method may further comprise, when the white-balance gain changes, computing a new color-correction temperature and a new color correction matrix for the auto-white-balance manual mode, depending on a maximum range of gain adjustment.

The slider may be configured to provide continuous range between a plurality of preset white-balance gains, and the method may further comprise: determining location information associated with a user-selected indicator on the slider; and applying an interpolation function to determine the target white-balance gains corresponding to the location information of the user-selected indicator relative to two preset white-balance points on opposing sides of the user-selected indicator.

The interpolation function may use an interpolation ratio that is based on a correlated color temperature of the two preset white-balance points.

The slider may be centered on the auto-white-balance decision for the current frame and include a range that covers at least a portion of a full illuminant range.

The manual-white-balance control may include: a first slider configured to enable manual-white-balance adjustment substantially between red and blue colors; and a second slider configured to enable manual-white-balance adjustment substantially between purple and green colors.

The method may further comprise: receiving an additional user input selecting a white-balance lock; and responsive to receiving the additional user input, locking the target white-balance gains to prevent additional gain adjustments in the auto-white-balance mode and the manual-white-balance mode; and applying the target white-balance gains to subsequent frames displayed in the live-preview mode of the camera application.

The user input may initiate a touch-white-balance variant of the manual-white-balance control, and the method may further comprise: receiving an additional user input that includes a touch by user's finger on the display device; determining a region of interest corresponding to the touch prior to determining the auto-white-balance decision; performing the determining of the auto-white-balance decision using RGB information within the region of interest; and applying the target white-balance gains to subsequent frames displayed in the live-preview mode.

A mobile electronic device comprising: a display device; a camera system; one or more processors; and memory storing: instructions that, when executed by the one or more processors, cause the one or more processors to implement a hybrid white-balance mode for the camera system by performing the method disclosed above.

A computer-readable medium comprising instructions which, when executed by one or more processors, cause the one or more processors to carry out the method disclosed above.

Conclusion

Although aspects of the hybrid white-balance mode in a camera system of an electronic device have been described in language specific to features and/or methods, the subject of the appended claims is not necessarily limited to the specific features or methods described. Rather, the specific features and methods are disclosed as example implementations of the claimed hybrid white-balance mode in a camera application of an electronic device, and other equivalent features and methods are intended to be within the scope of the appended claims. Further, various different aspects are described, and it is to be appreciated that each described aspect can be implemented independently or in connection with one or more other described aspects.

What is claimed is:

1. A method for a hybrid white-balance mode in a camera system of an electronic device, the method comprising:

presenting, during a live-preview mode of a camera application of the camera system, a manual-white-balance control via a camera user interface displayed on a display device of the electronic device, the manual-white-balance control configured to enable user selection of a white-balance setting for performing a manual adjustment on a white balance with respect to a current frame presented in the live-preview mode of the camera application;

determining, using an auto-white-balance mode, an auto-white-balance decision on a red-green-blue, RGB, scale for the current frame based on one or more characteristics of the current frame;

receiving a user input that adjusts the manual-white-balance control displayed in the camera user interface;

determining, using a manual-white-balance mode, target white-balance gains for a white-balance adjustment of the current frame based on the user input to the manual-white-balance control and relative to the auto-white-balance decision, the auto-white-balance decision used as initial white-balance gains to determine the target white-balance gains that correspond to the user input to the manual-white-balance control; and applying the target white-balance gains to the current frame presented in the live-preview mode of the camera application for color correction, wherein the white balance adjustment based on the user input is maintained to determine subsequent target white-balance gains for subsequently captured frames relative to subsequent auto-white-balance decisions.

2. The method of claim 1, wherein determining the white-balance adjustment includes using a look-up-table to perform white-balance gain adjustments.

3. The method of claim 2, wherein the look-up-table defines values for an upper bound, a lower bound, and a center point corresponding to the manual-white-balance control.

4. The method of claim 3, wherein the white-balance adjustments include a red gain adjustment and a blue gain adjustment.

5. The method of claim 3, wherein the upper bound and the lower bound are tunable based on one or more parameters of the camera system.

6. The method of claim 3, wherein the manual-white-balance control comprises a slider extending between the upper bound and the lower bound.

7. The method of claim 6, further comprising:

determining location information associated with a user-selected indicator on the slider relative to a center of the slider;

passing the location information from the camera user interface to a white-balance module to compute the target white-balance gains in real time; and computing, by the white-balance module, the target white-balance gains for the white-balance adjustment by using the location information with the look-up-table to reference corresponding gain adjustment values.

8. The method of claim 6, wherein the slider is centered on the auto-white-balance decision for the current frame and includes a range that covers at least a portion of a full illuminant range.

9. The method of claim 6, wherein the manual-white-balance control includes:

a first slider configured to enable manual-white-balance adjustment substantially between red and blue color tones; and a second slider configured to enable manual-white-balance adjustment substantially between purple and green color tones.

10. The method of claim 1, wherein the manual-white-balance control includes a slider, the slider configured to provide continuous range between a plurality of preset white-balance gains, the method further comprising:

determining location information associated with a user-selected indicator on the slider; and applying an interpolation function to determine the target white-balance gains corresponding to the location information of the user-selected indicator relative to two preset white-balance points on opposing sides of the user-selected indicator.

11. The method of claim 10, wherein the interpolation function uses an interpolation ratio that is based on a correlated color temperature of each of the two preset white-balance points.

12. The method of claim 1, further comprising:

receiving an additional user input selecting a white-balance lock; and responsive to receiving the additional user input, locking the target white-balance gains to prevent additional gain adjustments in the auto-white-balance mode and the manual-white-balance mode; and applying the target white-balance gains to subsequent frames displayed in the live-preview mode of the camera application.

13. The method of claim 1, wherein the user input that adjusts the manual-white-balance control initiates a touch-white-balance variant of the manual-white-balance mode, and the method further comprises:

receiving an additional user input that includes a touch by user's finger on the display device;

determining a region of interest corresponding to the touch prior to determining the auto-white-balance decision;

performing the determining of the auto-white-balance decision for the current frame using RGB information within the region of interest; and applying the target white-balance gains to subsequent frames displayed in the live-preview mode.

14. A mobile electronic device comprising:

a display device;

a camera system;

one or more processors; and memory storing:

instructions that, when executed by the one or more processors, cause the one or more processors to present, during a live-preview mode of a camera application of the camera system, a manual-white-balance control via a camera user interface displayed on the display device, the manual-white-balance control configured to enable user selection of a white-balance setting for performing a manual adjustment on a white balance with respect to a current frame presented in the live-preview mode of the camera application;

determine, using an auto-white-balance mode, an auto-white-balance decision on a red-green-blue, RGB, scale for the current frame based on one or more characteristics of the current frame;

receive a user input that adjusts the manual-white-balance control displayed in the camera user interface;

determine, using a manual-white-balance mode, target white-balance gains for a white-balance adjustment of the current frame based on the user input to the manual-white-balance control and relative to the auto-white-balance decision, the auto-white-balance decision used as initial white-balance gains to determine the target white-balance gains that correspond to the user input to the manual-white-balance control; and apply the target white-balance gains to the current frame presented in the live-preview mode of the camera application for color correction, wherein the white balance adjustment based on the user input is maintained to determine subsequent target white-balance gains for subsequently captured frames relative to subsequent auto-white-balance decisions.

15. A non-transitory computer-readable medium comprising instructions which, when executed by one or more processors, cause the one or more processors to carry out operations comprising:

presenting, during a live-preview mode of a camera application of a camera system, a manual-white-balance control via a camera user interface displayed on a display device of an electronic device, the manual-white-balance control configured to enable user selection of a white-balance setting for performing a manual adjustment on a white balance with respect to a current frame presented in the live-preview mode of the camera application;

determining, using an auto-white-balance mode, an auto-white-balance decision on a red-green-blue, RGB, scale for the current frame based on one or more characteristics of the current frame;

receiving a user input that adjusts the manual-white-balance control displayed in the camera user interface;

determining, using a manual-white-balance mode, target white-balance gains for a white-balance adjustment of the current frame based on the user input to the manual-white-balance control and relative to the auto-white-balance decision, the auto-white-balance decision used as initial white-balance gains to determine the target white-balance gains that correspond to the user input to the manual-white-balance control; and applying the target white-balance gains to the current frame presented in the live-preview mode of the camera application for color correction, wherein the white balance adjustment based on the user input is maintained to determine subsequent target white-balance gains for subsequently captured frames relative to subsequent auto-white-balance decisions.

* * * * *